United States Patent
Zielkowski et al.

(10) Patent No.: US 10,460,539 B2
(45) Date of Patent: Oct. 29, 2019

(54) LOOSE ITEM MANAGEMENT SYSTEMS AND METHODS FOR AMUSEMENT PARK RIDES

(71) Applicant: Universal City Studios LLC, Universal City, CA (US)

(72) Inventors: Amanda K. Zielkowski, Orlando, FL (US); Michelle Phillips, Oakland, CA (US); John Ugrin, Orlando, FL (US); Alexandria Catania, Clarks Summit, PA (US); Steven C. Blum, Orlando, FL (US); Matthew Preston Jones, Honolulu, HI (US)

(73) Assignee: Universal City Studios LLC, Universal City, CA (US)

( * ) Notice: Subject to any disclaimer, the term of this patent is extended or adjusted under 35 U.S.C. 154(b) by 132 days.

(21) Appl. No.: 15/686,007

(22) Filed: Aug. 24, 2017

(65) Prior Publication Data
US 2018/0061157 A1  Mar. 1, 2018

Related U.S. Application Data

(60) Provisional application No. 62/378,952, filed on Aug. 24, 2016, provisional application No. 62/509,563, filed on May 22, 2017.

(51) Int. Cl.
*E05B 73/00* (2006.01)
*A45C 13/18* (2006.01)
(Continued)

(52) U.S. Cl.
CPC .......... *G07C 9/00111* (2013.01); *A45C 11/00* (2013.01); *A45C 13/18* (2013.01);
(Continued)

(58) Field of Classification Search
CPC ...... E05B 73/0011; E05B 65/00; E05B 65/52; A45C 2011/002; A45C 13/18;
(Continued)

(56) References Cited

U.S. PATENT DOCUMENTS

| 4,783,978 A | 11/1988 | Vallerga |
| 5,061,086 A | 10/1991 | Vallerga |

(Continued)

FOREIGN PATENT DOCUMENTS

| CN | 2726239 | 9/2005 | |
| DE | 9215448 U1 * | 5/1994 | ............. A45C 13/20 |

(Continued)

OTHER PUBLICATIONS

PCT/US2018/033731 International Search Report and Written Opinion dated Nov. 7, 2018.

*Primary Examiner* — Justin M Larson
(74) *Attorney, Agent, or Firm* — Fletcher Yoder P.C.

(57) ABSTRACT

A system includes a portable locker including a container that may receive and store items and a first lock coupled to the container and that may lock the container to block access to the stored items. The first lock includes a detector that may receive a wireless signal, and receiving the wireless signal causes the first lock to lock or unlock. The system also includes a restraint coupled to the container and includes a second lock. The second lock may secure the portable locker to a rider of an amusement park ride.

20 Claims, 17 Drawing Sheets

(51) Int. Cl.

| | | |
|---|---|---|
| *A63G 7/00* | (2006.01) | |
| *G07C 9/00* | (2006.01) | |
| *A63G 31/00* | (2006.01) | |
| *A45F 3/00* | (2006.01) | |
| *A45F 3/04* | (2006.01) | |
| *A45F 3/02* | (2006.01) | |
| *E05B 65/52* | (2006.01) | |
| *A45F 5/02* | (2006.01) | |
| *A45C 11/00* | (2006.01) | |
| *A45C 13/20* | (2006.01) | |
| *G07F 17/12* | (2006.01) | |
| *G06Q 20/32* | (2012.01) | |
| *E05B 47/00* | (2006.01) | |
| *G07C 11/00* | (2006.01) | |

(52) U.S. Cl.
CPC ............ *A45C 13/185* (2013.01); *A45C 13/20* (2013.01); *A45F 3/005* (2013.01); *A45F 3/02* (2013.01); *A45F 3/04* (2013.01); *A45F 5/02* (2013.01); *A63G 31/00* (2013.01); *E05B 65/52* (2013.01); *E05B 73/0011* (2013.01); *G06Q 20/322* (2013.01); *G07C 9/00182* (2013.01); *G07C 9/00912* (2013.01); *G07F 17/12* (2013.01); *A45C 2011/001* (2013.01); *A45C 2011/002* (2013.01); *A45C 2011/003* (2013.01); *A45F 2003/001* (2013.01); *A45F 2003/025* (2013.01); *E05B 65/5215* (2013.01); *E05B 2047/0094* (2013.01); *G07C 2009/00793* (2013.01); *G07C 2011/02* (2013.01)

(58) Field of Classification Search
CPC ....... A45C 13/20; A45C 13/185; A45F 3/005; A45F 2200/0516; A63G 7/00; A63G 31/00; B60R 7/00; B60R 7/04; G07C 9/00182; G07C 9/00309; G07C 9/00571; G07C 2011/02

See application file for complete search history.

(56) References Cited

U.S. PATENT DOCUMENTS

| | | | | |
|---|---|---|---|---|
| 5,873,505 A | * | 2/1999 | Sovitski | A44B 11/266 224/576 |
| 6,368,262 B1 | * | 4/2002 | Willoughby | A01K 15/04 119/796 |
| 6,604,390 B1 | * | 8/2003 | Nooner | B65D 55/14 109/50 |
| 6,912,879 B1 | * | 7/2005 | Yu | E05B 35/105 70/284 |
| 7,086,255 B2 | * | 8/2006 | Reason | A44B 19/301 211/4 |
| 8,253,533 B2 | * | 8/2012 | Jones | G07C 9/00103 340/5.61 |
| 8,253,553 B2 | | 8/2012 | Jones | |
| 8,500,012 B2 | * | 8/2013 | Amdahl | G06Q 20/385 235/381 |
| 9,032,767 B2 | * | 5/2015 | Takahashi | A44B 11/2546 24/614 |
| 9,154,486 B1 | * | 10/2015 | Saylor | E05B 65/52 |
| 9,545,146 B1 | * | 1/2017 | King | H04N 1/00901 |
| 9,819,788 B2 | | 11/2017 | Dugoni | |
| 9,914,428 B2 | * | 3/2018 | Zamperla | B60R 21/01512 |
| 2002/0158093 A1 | * | 10/2002 | Westimayer | A01M 31/02 224/155 |
| 2004/0022455 A1 | * | 2/2004 | Reason | A44B 19/301 383/5 |
| 2004/0066366 A1 | | 4/2004 | Jung et al. | |
| 2005/0040931 A1 | * | 2/2005 | Shitan | G07C 9/00309 340/5.5 |
| 2006/0043128 A1 | * | 3/2006 | Cushman | A45C 13/42 224/162 |
| 2007/0180873 A1 | * | 8/2007 | Yen | A45C 13/12 70/63 |
| 2009/0226050 A1 | * | 9/2009 | Hughes | A45C 13/18 382/124 |
| 2010/0027921 A1 | * | 2/2010 | Thomson | A45C 13/103 383/64 |
| 2010/0264188 A1 | | 10/2010 | Carlsson et al. | |
| 2011/0074541 A1 | * | 3/2011 | Jones | G07C 9/00103 340/5.61 |
| 2012/0162436 A1 | * | 6/2012 | Cordell | G11B 27/034 348/158 |
| 2012/0187003 A1 | | 7/2012 | Stewart et al. | |
| 2012/0298018 A1 | * | 11/2012 | McCabe | A45C 13/20 109/51 |
| 2013/0077896 A1 | | 3/2013 | Wiley et al. | |
| 2013/0119096 A1 | * | 5/2013 | Morgan | A45F 3/005 224/148.1 |
| 2014/0054335 A1 | * | 2/2014 | Morgan | A45C 11/00 224/222 |
| 2014/0361062 A1 | | 12/2014 | Newton | |
| 2015/0157116 A1 | * | 6/2015 | Williams | A45F 5/004 224/162 |
| 2015/0201744 A1 | | 7/2015 | Heien et al. | |
| 2015/0351513 A1 | * | 12/2015 | Park | A45C 13/18 150/102 |
| 2016/0316053 A1 | | 10/2016 | Dugoni | |
| 2017/0231349 A1 | * | 8/2017 | McLean | A47B 81/005 340/5.52 |
| 2017/0245612 A1 | * | 8/2017 | Janzen | A45C 13/103 |
| 2017/0270734 A1 | * | 9/2017 | Geraghty | G07C 11/00 |
| 2018/0061157 A1 | * | 3/2018 | Zielkowski | A45F 5/02 |
| 2018/0078992 A1 | * | 3/2018 | High | G06Q 10/08 |
| 2018/0279745 A1 | * | 10/2018 | King | A45F 3/04 |
| 2018/0283053 A1 | * | 10/2018 | McLean | E05B 65/52 |
| 2018/0322719 A1 | * | 11/2018 | Jones | G07C 9/00309 |

FOREIGN PATENT DOCUMENTS

| | | | | |
|---|---|---|---|---|
| DE | 202012003231 U1 | * | 5/2012 | ............ A45C 13/20 |
| DE | 202018103265 U1 | * | 6/2018 | ............ E05G 1/00 |
| GB | 2506437 A | * | 4/2014 | ............ A45C 13/18 |
| PL | 122103 | | 12/2014 | |

* cited by examiner

LOOSE ITEM MANAGEMENT SYSTEMS AND METHODS FOR AMUSEMENT PARK RIDES

CROSS REFERENCE TO RELATED APPLICATIONS

This application claims the benefit of U.S. Provisional Application No. 62/378,952, filed Aug. 24, 2016, and U.S. Provisional Application No. 62/509,563, filed May 22, 2017. Each of the foregoing applications is hereby incorporated by reference in its entirety.

BACKGROUND

The present disclosure relates generally to the field of amusement parks. More specifically, embodiments of the present disclosure relate to systems and methods utilized to manage loose items for guests during amusement park experiences.

Various amusement park rides have been created to provide riders with unique motion and visual experiences. For example, theme rides can be implemented with single-rider or multi-rider vehicles that travel along a path or utilize a motion base. Excitement is often created by the speed or change in direction of the vehicles as they move along a ride path or follow a motion routine. However, the associated motion may also cause a loose item (e.g., a cell phone, cameras, keys, wallet, etc.) in the possession of a rider to become extricated from control of the rider. Once a loose item is out of the rider's control during a ride, the loose item may be lost, it may be damaged, or it may cause damage to equipment and so forth.

Traditionally, loose items are kept in lockers to avoid issues associated with taking them on rides at an amusement park. However, the cost of building lockers is typically high, and the lockers permanently occupy valuable space within the amusement park. Additionally, riders are often reluctant to put their loose items (e.g., cell phones, wallets, keys, and cameras) in lockers. Moreover, riders may use their cell phones to display ride passes (e.g., passes with priority rights) that are scanned at an entrance of the ride. Therefore, the rider's cell phone may need to be readily accessible prior to loading the ride. Riders often prefer to keep their loose items on their person so that they can use them while waiting in line and other reasons. Accordingly, it is now recognized that there is a need for an improved loose item storage system that allows guests to have control of their loose items during operation of the amusement park ride.

BRIEF DESCRIPTION

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a system includes a portable locker including a container that may receive and store items and a first lock coupled to the container and that may lock the container to block access to the stored items. The first lock includes a detector that may receive a wireless signal, and receiving the wireless signal causes the first lock to lock or unlock. The system also includes a restraint coupled to the container and includes a second lock. The second lock may secure the portable locker to a rider of an amusement park ride.

In accordance with a second embodiment, a system includes a portable locker including a container that may receive and store items. The container includes a first lock that may lock the container to restrict access to the stored items, and the first lock includes a detector that may receive a wireless signal that may lock or unlock the first lock. The system also includes a ride vehicle having a retaining bar that may reversibly couple to the portable locker. The retaining bar includes a locking mechanism that may switch between a secured and unsecured configuration based on a locking signal received from a controller.

In accordance with a third embodiment, a system includes a portable locker including a first pouch and a second pouch configured to move relative to the first pouch. Each pouch may receive and store items. The system also includes a first lock coupled to the first pouch and that may lock the pouch to block access to the stored items. The first lock includes a detector that may receive a wireless signal that may lock or unlock the first lock. The system also includes a reel disposed on the first pouch and having a retractable lanyard coupled to the second pouch. The retractable lanyard may release and retract the second pouch to allow movement of the second pouch relative to the first pouch. The system also includes a restraint coupled to the first pouch and including a second lock. The second lock may secure the portable locker to a rider of an amusement park ride.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments of the disclosure are directed to systems and methods for managing loose items in a manner that facilitates rider control of their items during queue times for amusement park rides while also blocking access to the items while riders are on the rides. For example, the disclosed system and methods include a portable locker (e.g., container, bag, pouch, or the like) that a rider may use to store their loose items. The portable locker allows the rider to have possession of, and access to, their loose items during queue times for the rides. Further, present embodiments facilitate controlled access to the items stored in the portable locker to avoid inadvertent or intentional circumvention of controls for preventing loose items on a ride by restricting access to a locking mechanism used to secure the rider's items. For example, the portable locker may include a locking mechanism that, once activated, may block the rider from accessing the loose items stored in the portable locker during operation of the amusement park ride. The locking mechanism may be activated at any time prior to the start of the amusement park ride to secure the rider's loose items and block access of the rider's loose items when the rider is enjoying the amusement park ride. Once the amusement park ride ends, the locking mechanism may be deactivated to allow the rider to access and/or retrieve their loose items from the portable locker. In this way, the rider may have control of their loose items during queue times and be in proximity to the loose items without having access to them during operation of the amusement park ride.

Figure 1:
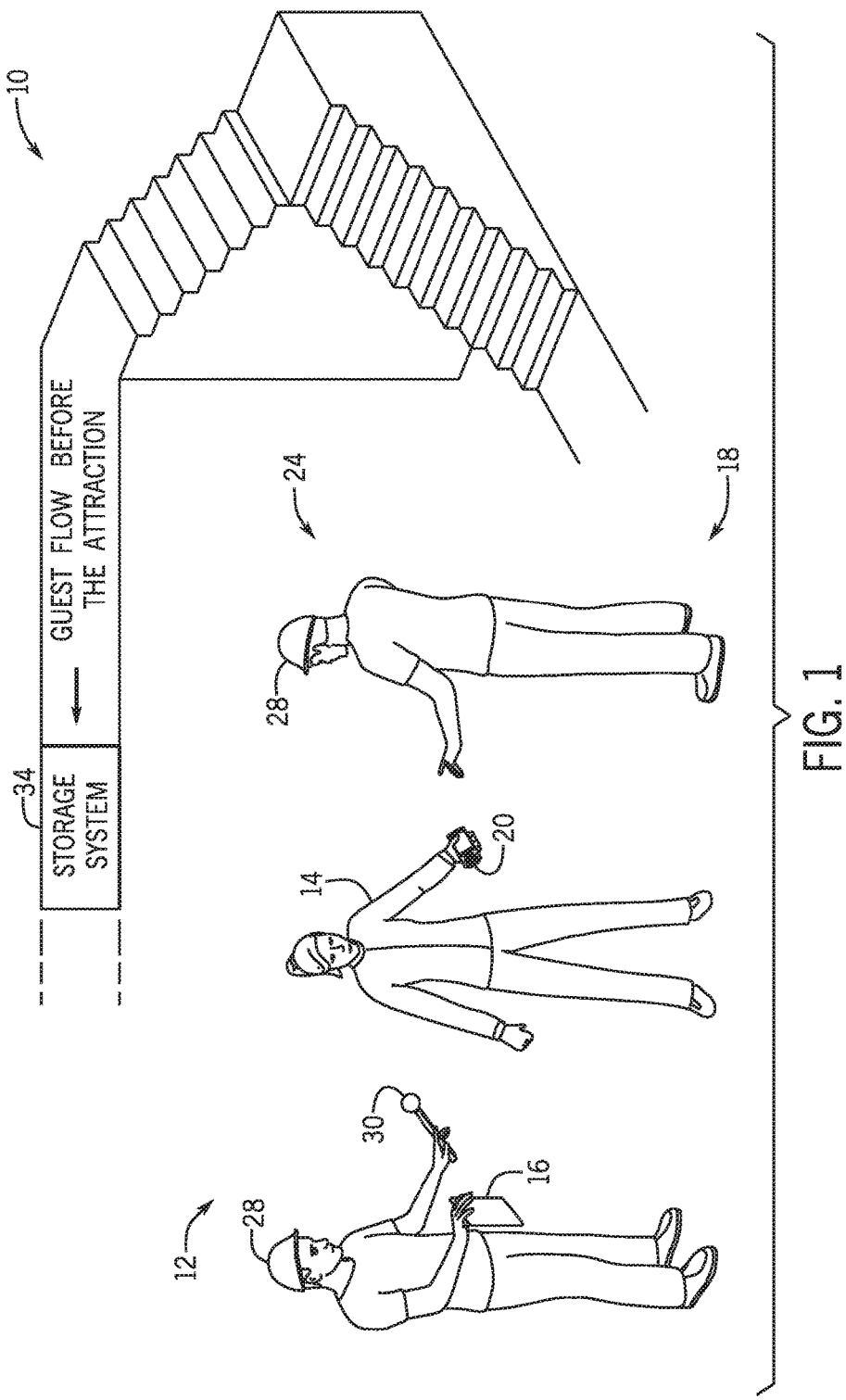
FIG. 1 is a schematic representation of an amusement park ride, whereby a rider of the amusement park ride is provided with a portable locker for management of loose items at an entrance of the amusement park ride, in accordance with an embodiment of the present disclosure.

FIG. 1 illustrates an embodiment of an amusement park ride 10 that uses a portable locker to store a rider's loose items during operation of the amusement park ride 10. In the illustrated embodiment, the amusement park ride 10 includes a distribution point 12 along a queue for the amusement park ride 10 for providing a rider 14 with a portable locker 16 that secures loose items 20 belonging to the rider 14. The distribution point 12 may be located at an entrance 18, at a loading station, or any other location between the entrance 18 and the loading station of the amusement park ride 10. In addition to the distribution point 12, the amusement park ride 10 includes a control point 24 for monitoring storage of the loose items 20 within the portable locker 16. In the illustrated embodiment, one or more crew members 28 may be stationed at the distribution point 12 to monitor for the loose items 20 and/or to provide the rider 14 with the portable locker 16 for storage of the loose items 20. The distribution point 12 may be positioned prior to the control point 24 (e.g., a metal detector) of the amusement park ride 10. However, in other embodiments, the distribution point 12 and the control point 24 may be positioned within the same location or may be overlapping. As used herein, the control point 24 is intended to denote the location where verification that loose items are properly stored and secured within the portable locker 16 takes place.

In some embodiments, the one or more crew members 28 may distribute the portable locker 16 to the rider 14 immediately prior to riding/participating in the entertainment experience. For example, the distribution point 12 may be immediately prior or essentially overlapping with the loading station for the amusement park ride 10. The "loading station" as used herein is intended to denote an area where the rider 14 boards a ride vehicle of the amusement park ride. In one embodiment, the one or more crew members 28 may distribute the portable locker 16 about 20 or 30 feet (about 6-9 meters) before the control point 24 or lock point. However, the portable locker 16 may be distributed to the rider 14 at any other location within the amusement park (e.g., at the entrance 18 or at an entrance to the amusement park). The "lock point" as used herein is intended to denote the point at which the portable locker is locked and unable to be opened to access the stored loose items. A "lock point" may refer to a location (e.g., all items are locked beyond a certain physical location), a time point (e.g., all items are locked after a particular time), or an event point (e.g., all items are locked before a particular event, such as a vehicle movement start). In other embodiments, the riders 14 may purchase portable lockers 16 that are themed and, therefore, are already in possession of the rider 14 for use in accordance with present embodiments.

As discussed previously, the rider 14 may be provided with the portable locker 16 at the distribution point 12 prior to passing through the control point 24. In certain embodiments, the distribution point 12 may include a scanner 30 (e.g., a metal detector or other suitable scanner) that detects the presence of the loose items 20. For example, in the illustrated embodiment, the scanner 30 is a hand held scanner that may be used by the one or more crew members 28 to scan for and detect the loose items 20 on the rider 14. In other embodiments, the scanner 30 may be a stationary or fixed scanner that the rider 14 may walk through. The scanner 30 alerts the one or more crew members 28 that the rider 14 has loose items 20 on their person. Accordingly, the one or more crew members 28 provides the rider 14 with the portable locker 16 and instructs the rider 14 to place their loose items 20 into the portable locker 16. The rider 14 may undergo additional scanning with the scanner 30 to detect other loose items 20. Once the rider's loose items 20 are disposed within the portable locker 16, and no other items are determined to be present on the rider 14, the portable locker 16 may be locked by activating a locking mechanism. As discussed in detail below, the locking mechanism may not be unlocked without receiving a lock deactivation signal transmitted after completion of the amusement park ride 10 and when the rider 14 has possession of the portable locker 16 storing their loose items 20.

Following placement and locking of the loose items 20 in the portable locker 16, the rider 14 may proceed to the control point 24, where the one or more crew members 28 may verify that the loose items 20 are locked and secured within the portable locker 16. In certain embodiments, the rider 14 may proceed to place their portable locker 16 within a storage system 34 that retains the portable locker 16 while the rider 14 enjoys the amusement park ride 10. The storage system 34 may be positioned at any point along the queue of the amusement park ride 10. In particular, it may be desirable to position the storage system 34 at or near a loading/section of the amusement park ride 10 to facilitate access to the storage system 34 for storage and retrieval of the portable locker 16. In other embodiments, the portable locker 16 may be wearable or configured to attach to a ride seat of the amusement park ride 10 such that the rider 14 may have the portable locker 16 in their possession during operation of the amusement park ride 10. As such, the storage system 34 may be located within the ride vehicle itself or omitted, thereby saving costs associated with manufacturing the storage system 34.

Figure 2:
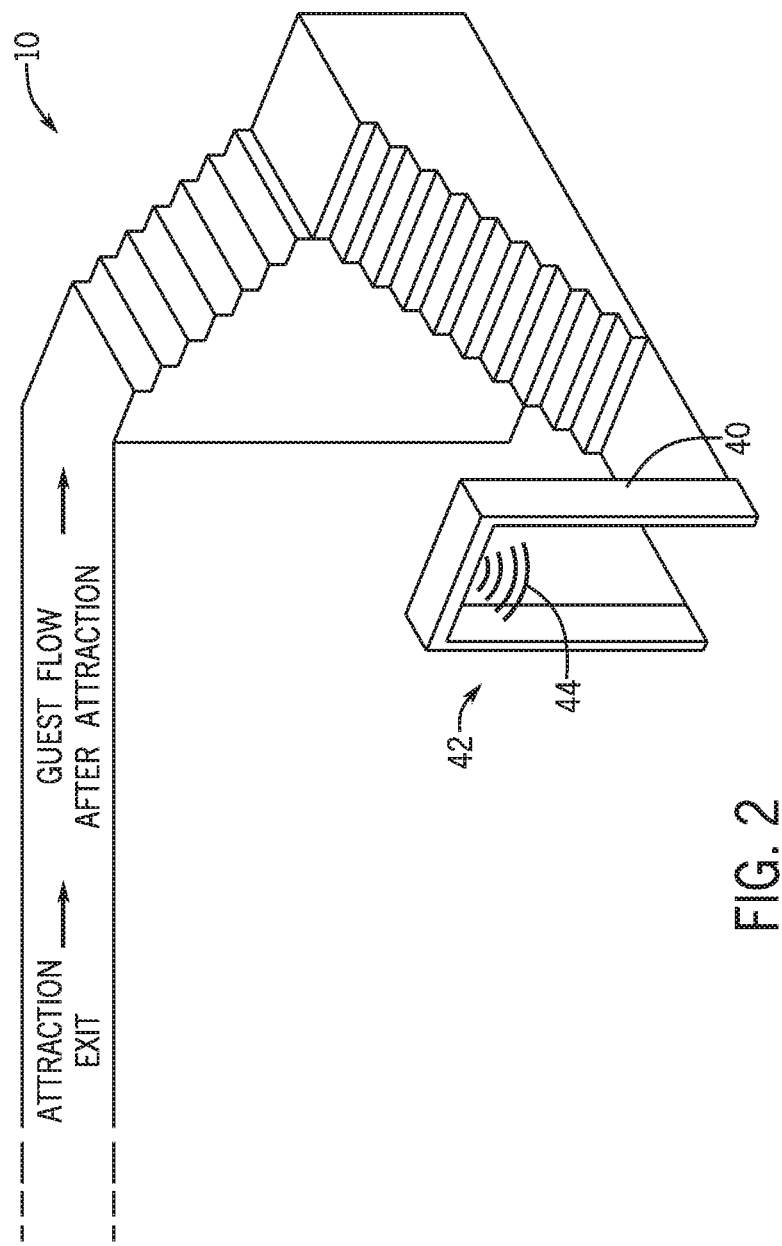
FIG. 2 is a schematic representation of the amusement park ride of FIG. 1, whereby an exit of the amusement park ride includes an unlocking system for unlocking the portable locker used by the rider to allow the rider to retrieve the loose items, in accordance with an embodiment of the present disclosure.

In embodiments in which the storage system 34 is used, upon completion of the amusement park ride 10, the rider 14 may exit the amusement park ride 10 and collect the portable locker 16 from the storage system 34. The locking mechanism of the portable locker 16 may be deactivated, thereby unlocking the portable locker 16 and allowing the rider 14 to retrieve the loose items 20 stored in the portable locker 16. As discussed previously, the locking mechanism may be unlocked after receiving a signal when the ride 10 is complete and the rider 14 has possession of the portable locker 16 storing their loose items 20. For example, FIG. 2 illustrates an embodiment of the amusement park ride 10 having an RFID gate 40 that is communicatively coupled to the portable locker 16 and that transmits a signal that unlocks the portable locker 16. In the illustrated embodiment, the RFID gate 40 is located at an exit 42 of the amusement park ride 10. However, the RFID gate 40 may be located at any other location between the unloading section and the exit 42. The RFID gate 40 transmits a deactivation signal 44 that unlocks the locking mechanism on the portable locker 16, thereby allowing the rider 14 to access the loose items 20 stored in the portable locker 16. In certain embodiments, the amusement park ride 10 may not include the RFID gate 40. Rather, the one or more crew members 28 may deactivate the locking mechanism of the portable locker 16 using a key card or other electronic key. By only deactivating the locking mechanism of the portable locker 16 after the rider 14 enjoys the amusement park ride 10, the rider 14 is prevented from accessing the loose items 20 that may otherwise be inadvertently separated from the rider 14 during operation of the amusement park ride 10. Further, by implementing loose items storage as a portable locker 16, loading and unloading is more efficient. The rider 14 simply holds the portable locker 16, which may be opened and accessed at their leisure, or while walking towards the exit, rather than having to stop at a fixed location within the amusement park ride 10.

Figure 3:
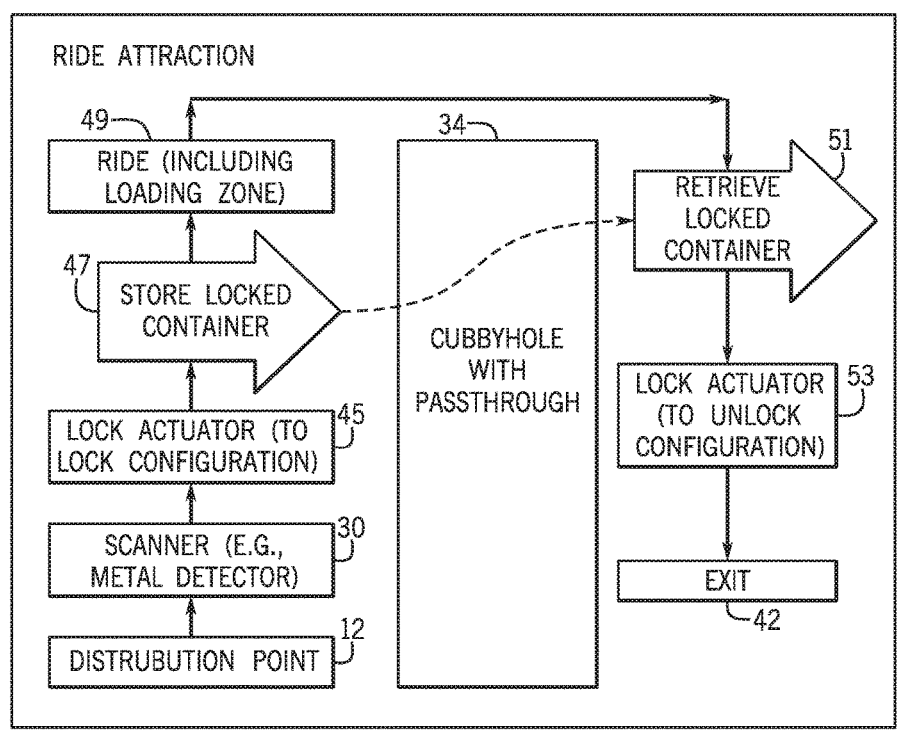
FIG. 3 is a process flow diagram for the management of loose items for the amusement park ride of FIGS. 1 and 2, in accordance with an embodiment of the present disclosure.

FIG. 3 is a process flow diagram 46 of an embodiment of the amusement park ride 10 that uses the portable locker 16 to store the rider's loose items 20. As discussed previously, the rider 14 may be provided with the portable locker 16 at the distribution point 12 and instructed to store their loose items 20 within the portable locker 16. The rider 14 is scanned using the scanner 30 for additional loose items 20 before the portable locker 16 is locked via, for example, a lock actuator 45. Once locked, the rider 14 proceeds to store the locked portable locker 16 in the storage system 34, as illustrated by arrow 47. Following storage of the locked portable locker 16, the rider proceeds to a loading station 49 of the amusement park ride 10. After completion of the amusement park ride 10, the rider 14 may retrieve the locked portable locker 16 from the storage system 34, as shown by arrow 51, and proceed to a second lock actuator 53 (e.g., the RFID gate 40) to unlock the portable locker 16 prior to exiting the amusement park ride 10 at the exit 42.

Figure 4:
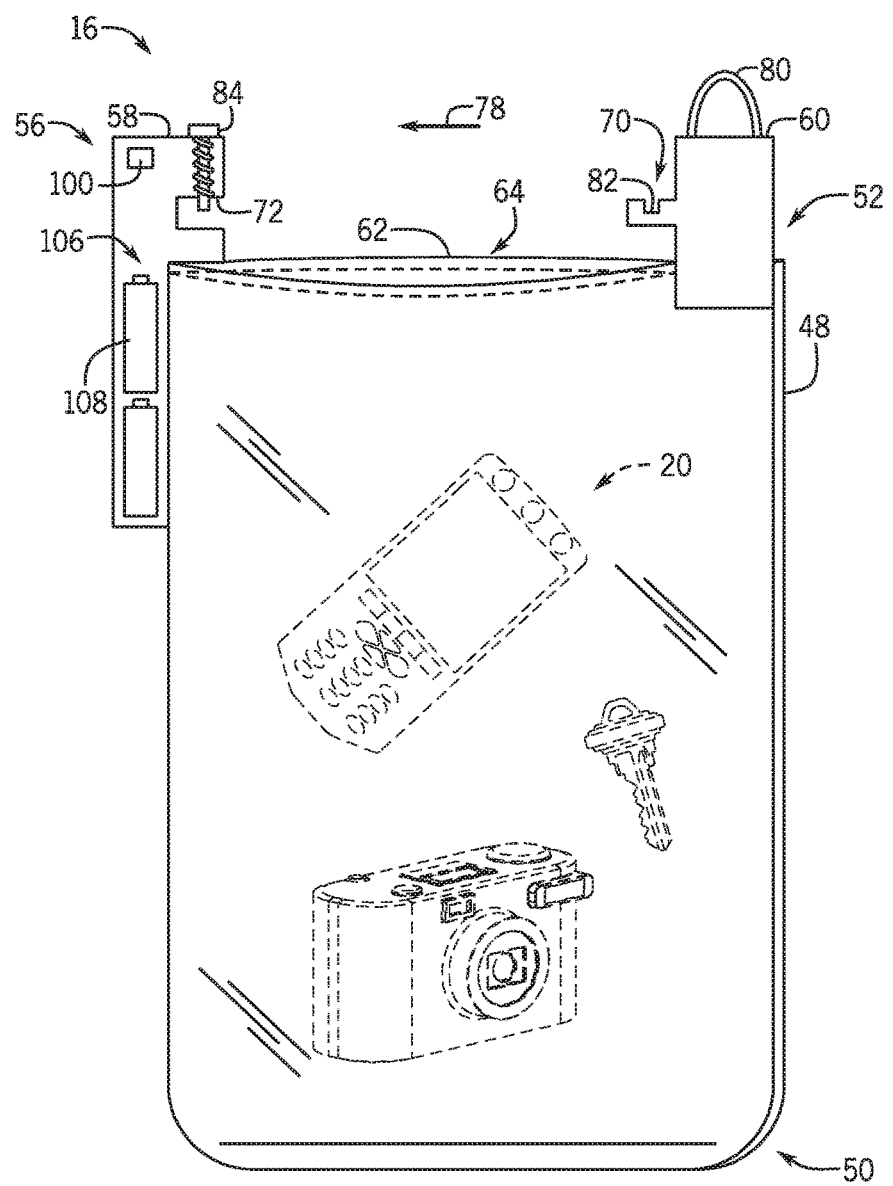
FIG. 4 is a schematic representation of a portable locker having a locking mechanism that blocks access of the rider's stored loose items during operation of the amusement park ride of FIG. 1, whereby the locking mechanism includes a zipper and an actuatable lock in an unlocked configuration, in accordance with an embodiment of the present disclosure.

As discussed previously, the rider 14 may use the portable locker 16 to store and secure the loose items 20 prior to enjoying the amusement park ride 10. The portable locker 16 may include features that block the rider 14 from retrieving the loose items 20 from the portable locker 16 after the portable locker 16 is locked. In this way, the loose items 20 may be contained within the portable locker 16 during operation of the amusement park ride 10. As discussed in further detail below with reference to FIGS. 15-21, the portable locker 16 may be a wearable locker that the rider 14 may take onto the amusement park ride 10. As such, the rider 14 may have possession of their loose items 20 at all times. FIG. 4 is a schematic view of an embodiment of the portable locker 16 that may be used by the rider 14 to store and secure the loose items 20. The portable locker 16 is representative of various types of portable lockers in accordance with present embodiments. As shown in the illustrated embodiment of FIG. 4, the portable locker 16 may include, or be implemented as, a lockable container, illustrated as a pouch 48 (e.g., pouch, container, box, bag, or the like) for storing the loose items 20 (e.g., cell phone, camera, keys, hat, wallet, or any other suitable loose item). It should be understood that the loose items 20 are items that are capable of being separated from the riders 14 and, as provided herein, may be nonetheless referred to as loose items 20 while contained and enclosed in the pouch 48. In certain embodiments, the pouch 48 stores the loose items 20 in a fully enclosed manner when sealed or locked such that the rider 14 cannot directly touch or access the loose items 20. The pouch 48 includes a sealed end 50 and a closable end 52 having a locking mechanism 56 configured to open (FIG. 4) and close (FIG. 5) the closable end 52. In the illustrated embodiment, the locking mechanism 56 includes a lock 58 (e.g., actuatable lock), a zipper 60, and zipper teeth 62 around a perimeter 64 of the closable end 52.

The pouch 48 may include or be implemented as a bag, a container, or any other suitable enclosure that may be used to retain and secure the loose items 20. The pouch 48 may be manufactured from materials such as fabrics, plastics, or both. In certain embodiments, at least a portion of the pouch 48 may be clear such that the rider 14 may view and/or use the loose items 20 stored in the portable locker 16. For example, the pouch 48 may enable the rider 14 to, through the intervening material of the pouch 48, interact with a touch screen or buttons of electronic devices (e.g., cell phone, camera, etc.) stored within the portable locker 16. During queue and/or operation of the amusement park ride 10, the rider 14 may access a camera (e.g., on a cell phone) to take a picture or video through the portable locker 16 while the portable locker 16 is locked. In some embodiments, the portable locker 16 may be capable of transitioning between modes to prevent or allow access of the loose items 20 (e.g., camera, cell phone, or the like) secured within the pouch 48. For example, in areas where pictures are not allowed, a transmission to electronics of the pouch 48 may cause the pouch 48 to turn an area from clear to opaque (e.g., with liquid crystals). As such, the rider 14 is unable to access the loose items 20, specifically electronic devices that may be used to take pictures or video.

Figure 5:
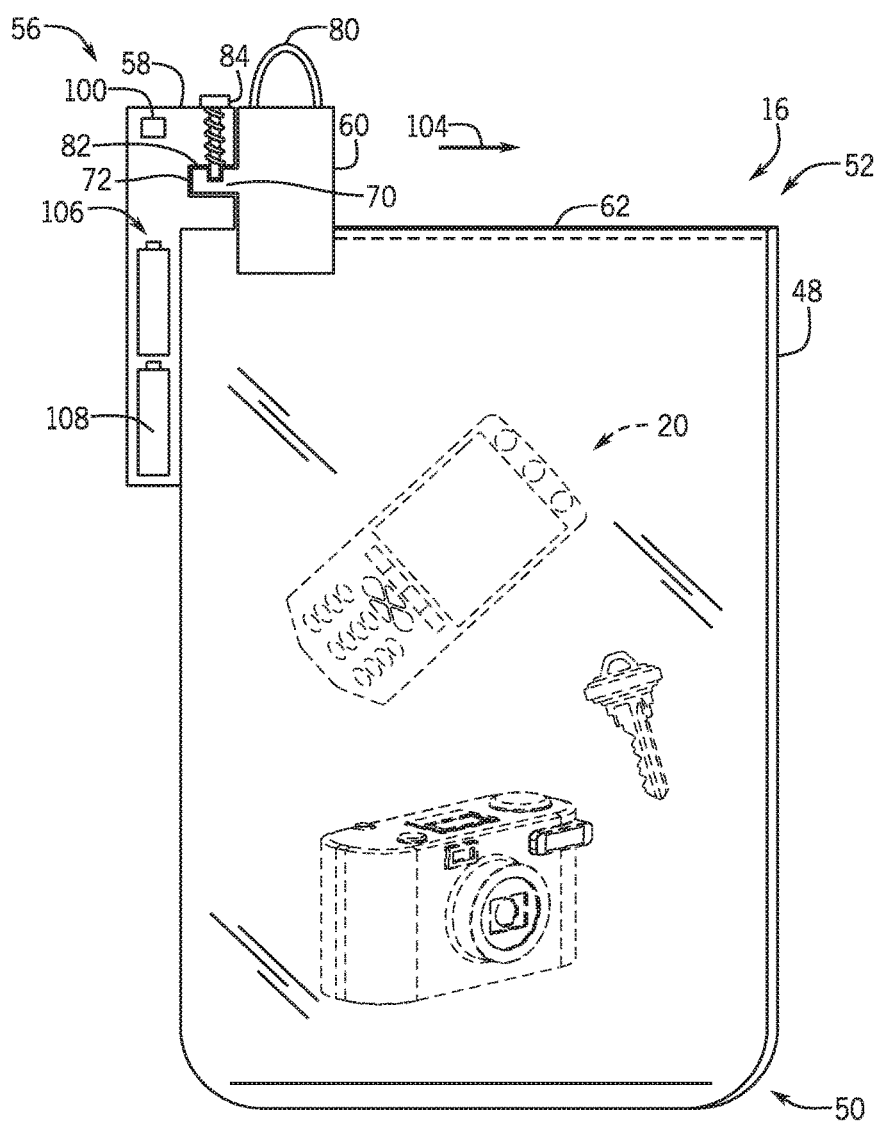
FIG. 5 is a schematic of the portable locker of FIG. 4, whereby the zipper and the actuatable lock of the locking mechanism are in a locked configuration, in accordance with an embodiment of the present disclosure.
Figure 6:
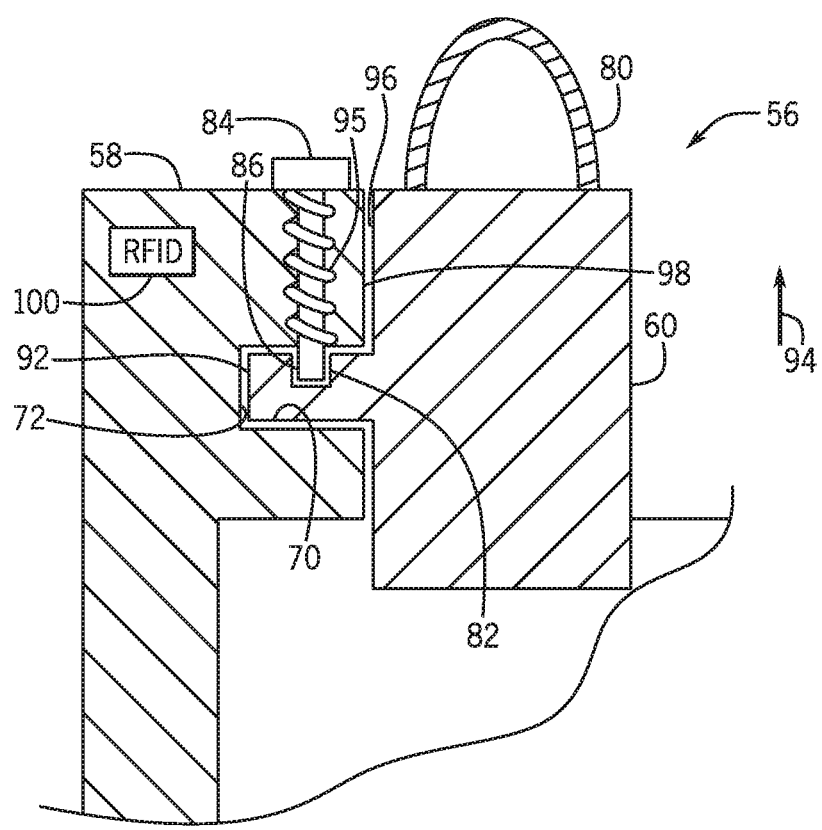
FIG. 6 is a cross-sectional view of the locking mechanism of FIG. 5, whereby the zipper includes a protrusion coupled to a locking pin of the actuatable lock, in accordance with an embodiment of the present disclosure.

As discussed previously, the portable locker 16 includes the locking mechanism 56 for securing and locking the loose items 20 within the pouch 48 to prevent removal of the loose items 20 from the portable locker 16 when the rider 14 is enjoying the amusement park ride 10. For example, the locking mechanism 56 may be used to close the closable end 52 after the rider 14 places the loose items 20 into the pouch 48, as shown in FIG. 5. The locking mechanism 56 may be configured such that it cannot be opened by the rider 14 until the portable locker 16 is taken to a specific location (e.g., the RFID gate 40) away from the amusement park ride 10 or a ride vehicle of the amusement park ride 10 reaches the unloading section. As shown in the embodiment of FIGS. 4-6, the zipper 60 includes at least one protrusion 70 that engages with a complementary recess 72 of the lock 58 to close the closable end 52 and secure the loose items 20 within the pouch 48. For example, after the rider 14 deposits the loose items 20 into the pouch 48, the rider 14 may apply a pulling force to the zipper 60, thereby moving the zipper 60 in a direction 78 toward the lock 58. The zipper 60 may include one or more features to facilitate moving the zipper 60 in the direction 78. In the illustrated embodiment, the zipper 60 includes a zipper pull 80 that the rider 14 or other person (e.g., the one or more crew members 28) may grip and apply the pulling force to move the zipper 60 in the direction 78. Pulling the zipper 60 in the direction 78 enables joining of the zipper teeth 62, thereby sealing (i.e., closing) the closable end 52, as shown in FIG. 5.

Once the zipper 60 reaches the lock 58, the at least one protrusion 70 is inserted into the recess 72. The at least one protrusion 70 includes a notch 82 that engages with a locking pin 84 (e.g., a spring-loaded locking pin) of the lock 58. For example, FIG. 6 illustrates an embodiment of the locking mechanism 56 in a locked configuration. In the illustrated embodiment, the at least one protrusion 70 is engaged with the lock 58 via the notch 82 and the locking pin 84. A portion 86 of the locking pin 84 is disposed within the notch 82, thereby securing the zipper 60 to the lock 58. As discussed previously, the locking pin 84 may be a spring-loaded locking pin. Accordingly, as the at least one protrusion 70 is inserted into the recess 72, an end face 92 of the one or more protrusions 70 may push the locking pin 84 in a direction 94 to allow the at least one protrusion 70 to continue moving in the direction 78 until the notch 82 is aligned with the locking pin 84. In certain embodiments, the at least one or more protrusions 70 may be tapered to facilitate pushing the locking pin 84 in the direction 94. Movement of the locking pin 84 in the direction 94 compresses a spring 95 of the locking pin 84. Once the notch 82 and the locking pin 84 are aligned, the spring 95 biases the portion 86 of the locking pin 84 to snap, or otherwise be inserted, into the notch 82 to removably couple the zipper 60 and the lock 58. In the locked configuration, the at least one protrusion 70 is nested within the recess 72 and a side surface 96 of the zipper 60 abuts an abutment surface 98 of the lock 58. As should be noted, in certain embodiments, the lock 58 may include the at least one protrusion 70, and the zipper 60 may include the recess 72 and the locking pin 84. While the illustrated embodiment shows the zipper 60, it should be understood that other locks and implementations are contemplated in any of the disclosed embodiments, such as mechanical locks, magnetic locks, etc.

The locking mechanism 56 also includes a radio frequency identification (RFID) feature 100 that may function as an electronic key to lock and unlock the locking mechanism 56. For example, the RFID feature 100 may be a receiver that receives an activation signal prior to the rider 14 enjoying the amusement park ride 10. For example, the control point 24 may have a radio frequency (RF) chip that detects the RFID feature 100 and transmits the activation signal to the locking mechanism 56. Upon receiving the activation signal, the locking mechanism 56 may actuate the locking pin 84 and block movement of the locking pin 84 in the direction 94. By blocking movement of the locking pin 84, the zipper 60 is unable to be separated from the lock 58. In this way, the rider 14 may be unable to remove the loose items 20 from the portable locker 16 after passing the control point 24. While in the illustrated embodiment the RFID feature 100 is shown as being part of the lock 58, in other embodiments the RFID feature 100 is part of the zipper 60. Further, the control point 24 RF chip may, at the lock point, emit a blanket locking signal to all in-range portable lockers 16. In other embodiments, the control point 24 RF chip may emit the locking signal after a handshake communication (e.g., detection) of each portable locker 16.

The portable locker 16 may be unlocked at any point after completion of the amusement park ride 10. For example, once the ride 10 is complete and the rider 14 retrieves the portable locker 16 from the storage system 34, the RFID feature 100 may receive a deactivation signal emitted by the RFID gate 40 of the amusement park ride 10. For example, the RFID gate 40 may include an RFID chip that detects the RFID feature 100 and transmits the deactivation signal to the RFID feature 100. In response to the detected deactivation signal 44, the locking mechanism 56 may unlock the locking pin 84. Consequently, the portion 86 of the locking pin 84 may be released from the notch 82 by biasing the locking pin 84 in the direction 94, thereby releasing the zipper 60 from the lock 58. Once the locking pin 84 is moved from the closed position (e.g., position where the portion 94 is within the notch 85) to the open position (e.g., position where the portion 94 is not within the notch 84), the rider 14 or other person may pull the zipper 60 in a direction 104 that is substantially opposite the direction 78, thereby separating the zipper 60 from the lock 58 and decoupling the zipper teeth 62. Accordingly, the closable end 52 is opened and the rider 14 may retrieve their loose items 20 from the pouch 48.

In certain embodiments, the locking mechanism 56 may be powered by one or more batteries 108. Accordingly, the lock 58 may include a cavity 106 sized to fit the one or more batteries 108. By way of non-limiting example, the one or more batteries 108 may include lead-acid batteries, lithium ion batteries, nickel-cadmium, nickel-zinc, or any other suitable battery that may be used to power the locking mechanism 56.

Figure 7:
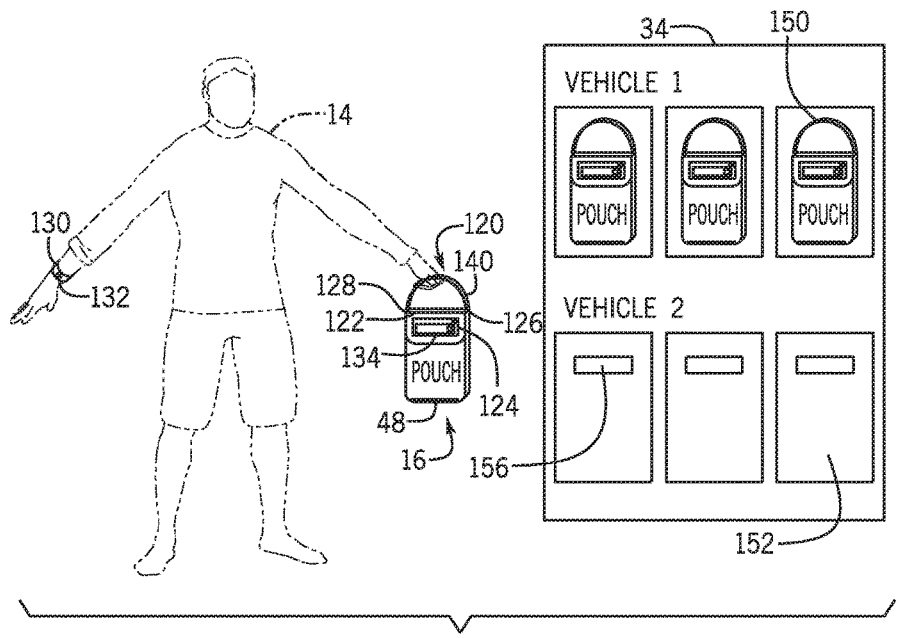
FIG. 7 is a schematic of a portable locker kit and storage system, whereby the locker pouch kit includes a pouch lock activated by a locking/unlocking device worn by the rider, and the storage system includes a storage rack having compartments that store and secure the portable locker, in accordance with an embodiment of the present disclosure.

FIG. 7 provides another example of the portable locker 16 that may be used by a rider 14 to stow the loose items 20 during operation of the amusement park ride 10. For example, in the illustrated embodiment, the portable locker 16 includes a locking loop 120, a loop lock 122, and a pouch lock 124 coupled to the pouch 48. The locking loop 120 extends from a first side 126 to a second side 128 of the portable locker 16. The locking loop 120 may be used to secure the portable locker 16 to the storage system 34 after the rider 14 secures the loose items 20 within the portable locker 16.

It should be noted that the locking loop 120 is an example of one of the various locking features in accordance with present embodiments. Accordingly, while specific embodiments illustrate and describe a locking loop, the locking loop 120 may be replaced with other locking features in accordance with present embodiments. Similarly, in certain embodiments, the portable locker 16 may be replaced by a different container (e.g., a box) that employs a corresponding locking feature (e.g., a box lock). The pouch 48 may be sized to accommodate specific devices (e.g., specific smart phone types) or a variety of items (e.g., keys and wallet). Different types of portable lockers 16 may be available, such as different sizes, colors, shapes, and materials.

As discussed previously, the portable locker 16 may be given to the rider 14 at any point prior to ride vehicle motion or start of the amusement park ride 10. The portable locker 16 may be distributed in the queue or, in certain embodiments, once riders 14 are loaded into the vehicles. Once the rider 14 deposits their loose items 20 into the portable locker 16, the rider 14 may lock the portable locker 16 by activating the pouch lock 124 and secure the loose items 20 within the portable locker 16. In certain embodiments, the portable locker 16 may be part of a kit that includes a locking/unlocking device 130 that activates and deactivates the pouch lock 124. The locking/unlocking device 130 may be in control of the rider 14 such that access to the portable locker 16 is restricted only to the rider 14 or a person designated by the rider 14. By way of non-limiting example, the locking/unlocking device 130 may be a wrist band, necklace, clip, ring, glove, or the like that is specific to the portable locker 16 given to the rider 14. In certain embodiments, the locking/unlocking device 130 may be coupled to the rider's park admissions ticket and/or ride boarding pass. Therefore, the rider 14 may have possession of the locking/unlocking device 130 at all times during operation of the amusement park ride 10. The rider 14 may place the locking/unlocking device 130 in close proximity to the pouch lock 124 (e.g., abutting, inserted into, adjacent to) to lock or unlock the pouch lock 124. In certain embodiments, the locking/unlocking device 130 may include a low electromagnetic frequency emitter. For example, in certain embodiments, the locking/unlocking device 130 may include a radio frequency (RF) chip 132 that is communicatively coupled to a corresponding RFID tag 134 associated with the pouch lock 124. The RF chip 132 may send one or more signals to the RFID tag 134 to enable locking and unlocking the pouch lock 124.

The locking loop 120 allows the rider 14 to secure the portable locker 16 to the storage system 34 (e.g., racks, storage compartments) via the locking loop 120. For example, a cord 140 corresponding to the locking loop 120 couples to the loop lock 122 to secure the portable locking pouch 16 to the storage system 34. As discussed in further detail below with reference to FIG. 9, the storage system 34 may include a pouch attachment feature that facilities securing the portable locker 16 to the storage system 34. While illustrated as separate locking mechanisms (e.g., the loop lock 122 and pouch lock 124) in FIG. 7, in some embodiments, a single locking mechanism is shared for both the pouch access point (e.g., the pouch lock 124) and the locking loop 120. For example, the cord 140 of the locking loop 120 may pass through a receptacle and then engage with the pouch lock 124, which can then be locked to not only secure the locking loop 120 in place, but also to lock the pouch 48 closed.

Figure 8:
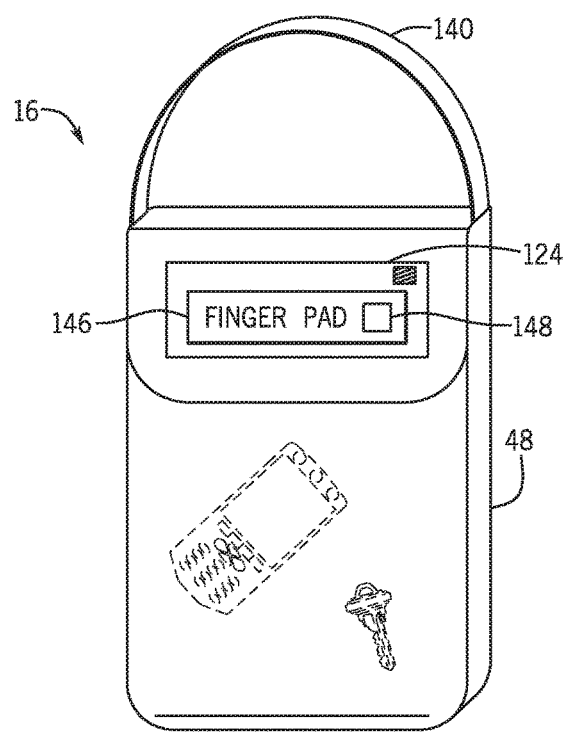
FIG. 8 is a schematic of the portable locker of FIG. 7, whereby the pouch lock includes a finger pad for locking and unlocking the portable locker, in accordance with an embodiment of the present disclosure.

In certain embodiments, the portable locker 16 may include a finger pad that is used to lock and unlock the loop lock 122, the pouch lock 124, or both. The finger pad registers a fingerprint of the rider 14 assigned to the portable locker 16. In this way, no one other than the rider 14 assigned to the portable locker 16 may retrieve the stored loose items 20 in the pouch 48 and/or the portable locker 16 from the storage system 34. FIG. 8 illustrates an embodiment of the portable locker 16 having a finger pad 146 on the pouch 48 that may be used to lock and unlock the portable locker 16. For example, the rider 14 may activate and deactivate the pouch lock 124 by pressing their finger against the finger pad 146. The finger pad 146 may include a memory 148 that stores the fingerprint of the rider 14. When the finger pad 146 recognizes the rider's fingerprint, the pouch lock 124 is activated to lock the pouch lock 124 and secure the loose items 20 in the portable locker 16 or deactivated to unlock the pouch lock 124 and allow the rider 14 to retrieve the items from the portable locker 16.

Returning to FIG. 7, once the rider 14 secures the loose items 20 in the portable locker 16, the rider 14 may store the portable locker 16 in the storage system 34 corresponding to the amusement park ride 10. In certain embodiments, the storage system 34 may include a rack having a locking mechanism that secures the portable locker 16 to the storage system 34. The locking mechanism may be controlled by the rider 14 such that the portable locker 16 assigned to the rider 14 may not be removed from the storage system 34 by another rider or park guest. Accordingly, in the illustrated embodiment, the storage system 34 may include a storage rack 150 having a plurality of compartments 152 that may be used to store and secure the portable locker 16 while the rider 14 enjoys the amusement park ride 10. By way of non-limiting example, the plurality of compartments 152 may include cubbies, hooks, shelves, or the like. The plurality of compartments 152 may be arranged in a series of rows and columns, where each row and/or column may be assigned to a ride vehicle of the amusement park ride 10. In certain embodiments, the portable locker 16 may be assigned to a specific compartment of the plurality of compartments 152. The plurality of compartments 152 may each be labeled (e.g., serialized) such that each portable locker 16 and locking/unlocking device 130 are assigned to a respective compartment of the plurality of compartments 152. Each compartment of the plurality of compartments 152 may include a storage lock 156 that may be activated and deactivated by the locking/unlocking device 130 in a manner similar to the pouch lock 124 to release the portable locker 16 from the compartment. In this way, the portable locker 16 may not be removed from the respective compartment 152 by another rider or park guest.

Following attachment of the portable locker 16 to the respective compartment of the plurality of compartments 152, the rider 14 may activate the pouch and storage lock 124, 156, respectively, to secure the portable locker 16 to the storage rack 150. Other storage racks may include different engagement features (see FIGS. 9 and 10A). Once the rider 14 has locked and stored the portable locker 16, the rider 14 may board the corresponding ride vehicle of the amusement park ride 10. The rider 14 retains the locking/unlocking device 130 during operation of the amusement park ride 10, which may provide a sense of comfort to the rider because the rider may feel less concerned that their loose items 20 may be removed from the amusement park ride 10 without their knowledge. After completion of the ride experience, the rider 14 may proceed to unlock the pouch and storage lock 124, 156, respectively, to retrieve the loose items 20 from the portable locker 16. Once the rider retrieves their items from the portable locker 16, the rider 14 may place the portable locker 16 in a collection bin that may collect the portable lockers 16 and allow reuse by other riders of the amusement park ride 10.

The storage system 34 may be stationary or mobile. That is, the storage system 34 may permanently fixed to a location or may move from one location to another location (e.g., from a loading station to an unloading station) within the amusement park ride 10. For example, the storage system 34 may be located at a central location near the loading and unloading stations of the amusement park ride 10. The rider 14 may approach the storage system 34 prior to boarding the ride vehicle to store and secure the portable locker 16. Similarly, the rider 14 may approach the storage station 34 after unloading from the ride vehicle to retrieve the stored items. In one embodiment, the plurality of compartments 152 associated with the storage station 34 may include a storage side facing the loading station and a pick-up side facing the unloading station. For example, each compartment of the plurality of compartments 152 may include a first door on the storage side and a second door on the pick-up side, each door having a lock. In this way, the rider 14 may access the storage side prior to boarding the ride vehicle (e.g., from a load queue upstream of the loading point) via the first door and may access the pick-up side from the unloading station (e.g., from an exit queue) via the second door to mitigate congestion at the storage system 34. This double-sided locker may be mechanically actuated such that doors open for guests to place items in the loading side during ride loading and then closes during operation of the ride 10. Similarly, when riders are exiting, the doors may be actuated to open from the unloading side during unloading.

Figure 9:
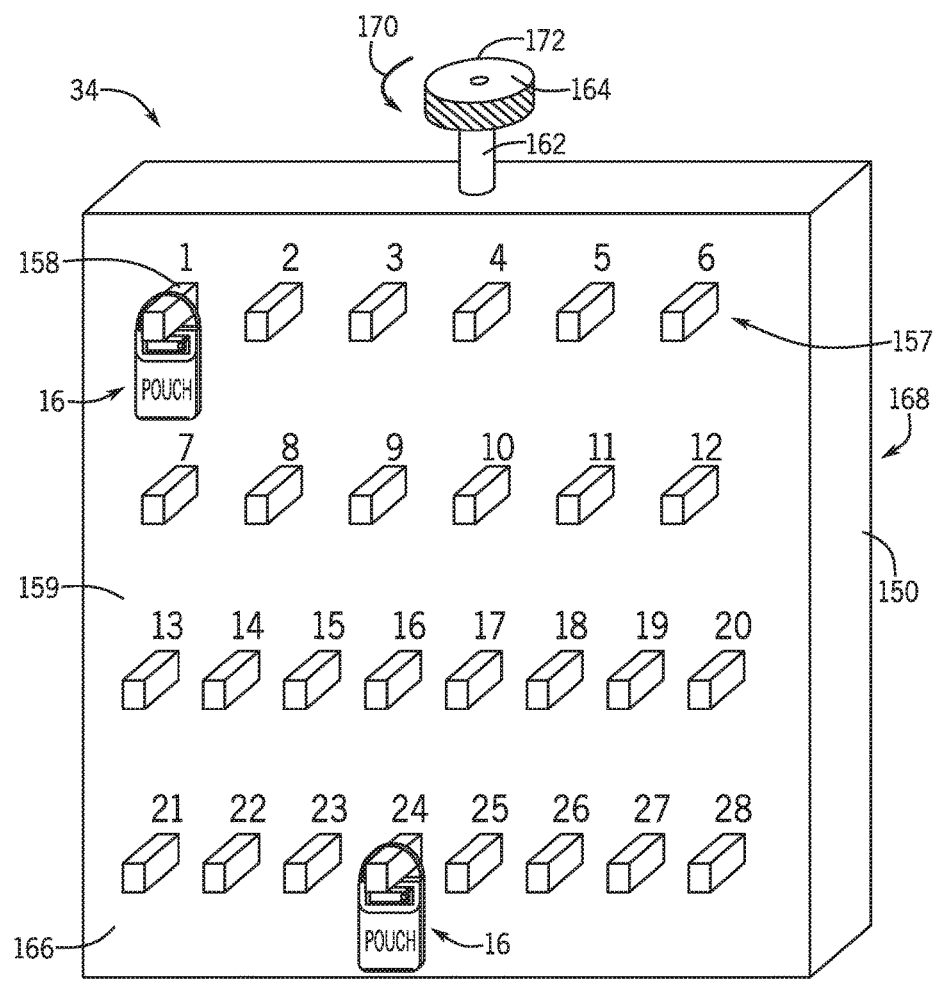
FIG. 9 is a schematic of a storage system for storing and securing the portable locker, whereby the storage system includes a storage rack having a peg board and rotates about an axis, in accordance with an embodiment of the present disclosure.

In certain embodiments, the plurality of compartments 152 includes a pouch attachment feature (e.g., pegs, hooks, or the like) that may be used to hang and secure the portable locker 16 onto the storage system 34. For example, the rider 14 may attach the locking loop 120 (or some other locking mechanism) to the pouch attachment feature associated with the respective compartment of the plurality of compartments 152. FIG. 9 is an exemplary embodiment of the storage system 34 in which the storage rack 150 is a peg board 157, or other similar board, that may facilitate mounting and securing the portable locker 16 to the storage system 34. The peg board 157 may include a plurality of pegs 158 (e.g., protrusions) or any other suitable support (e.g., hook, latch, or the like) that may engage with the locking loop 120 of the pouch to retain and secure the portable locker 16 to the storage rack 150. Each peg 158 extending from a surface 159 of the storage rack 150 may be assigned a number or other identifier that corresponds to a particular portable locker 16. The rider 14 may secure the portable locker 16 to the respective peg 158 as discussed previously with reference to FIG. 7.

In some embodiments, the plurality of compartments 152 or some other storage system 34 may rotate such that there is only a single door or access point for a particular rider. For example, the storage rack 150 may include the peg board 157 (or other storage features) on both sides and rotate about a motor driven spindle such that the same items placed on the storage rack 150 at an entry point of the ride 10 are accessible at an exit point of the ride 10. For example, as shown in FIG. 9, the storage system 34 includes a spindle 162 configured to rotate about an axis 164 to facilitate storage and retrieval of the portable locker 16 by the rider 14. The storage system 34 may be positioned between the loading and unloading stations of the amusement park ride 10 in a manner that a first side 166 of the storage rack 150 faces the loading station and a second side 168 of the storage rack 150 faces the unloading station. In this way, a first group of riders located at the loading station may lock and secure their respective portable locker 16 to the retaining member 158 on the first side 164, and a second group of riders at the unloading station may unlock and retrieve their respective portable locker 16 from the second side 168. Once the second group of riders have unlocked and retrieved their respective portable locker 16, the spindle 162 of the storage rack 150 may be rotated about the axis 164, as shown by arrow 170, to allow a group of riders at the loading station to lock and secure their respective portable locker 16 to the retaining members 158 located on the second side 168 of the storage rack 150, and allow the first group of riders to unlock and retrieve their respective portable locker 16 after enjoying the amusement park ride 10. The rotation of the spindle 162 may be achieved manually or mechanically. For example, in the illustrated embodiment, the spindle 162 is coupled to a motor 172 that rotates the spindle 162 about the axis 164. However, in certain embodiments, the one or more crew members 128 may manually rotate the storage rack 150. In some embodiments, each individual or a subset of storage areas (e.g., lockers or peg section) may rotate about a respective axis to achieve a similar result.

Figure 10A:
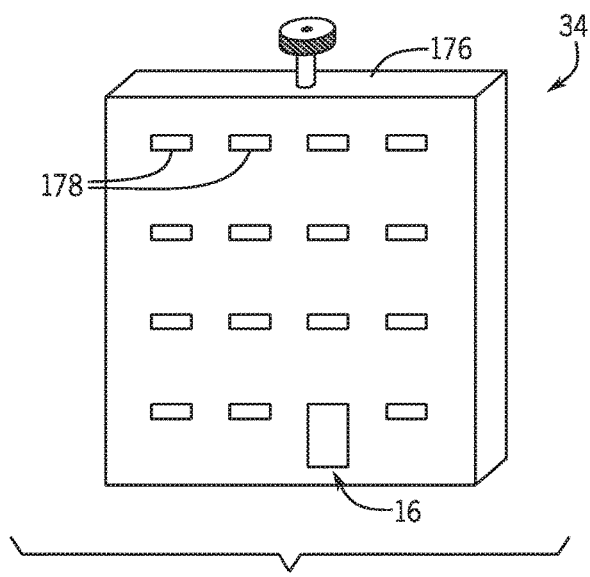
FIG. 10A is a diagram of a storage system for retaining and securing a portable locker, whereby the storage system includes a receptacle that receives a complementary rotational feature of the portable locker, in accordance with an embodiment of the present disclosure.
Figure 10B:
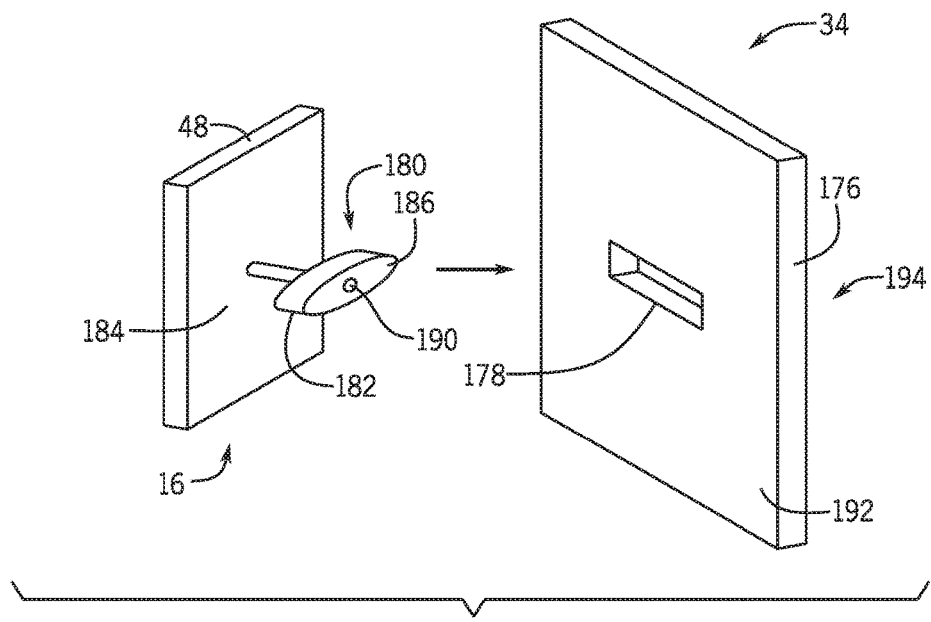
FIG. 10B is a diagram of the storage system of FIG. 10A and a portable locker having the complementary rotational feature on a back surface, whereby the complementary rotation feature is aligned with the receptacle of the storage system, in accordance with an embodiment of the present disclosure.
Figure 10C:
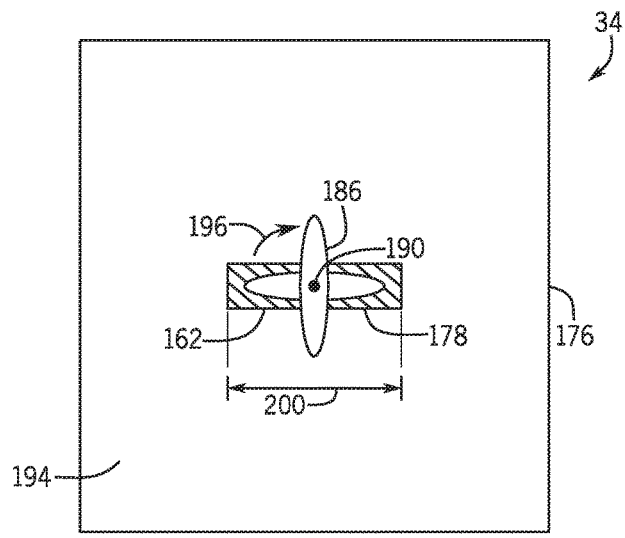
FIG. 10C is a diagram of the storage system of FIG. 10A and the portable locker of FIG. 10B, whereby the complementary rotational feature is inserted into the receptacle and rotated about an axis such that complementary rotational feature is not aligned with the receptacle, in accordance with an embodiment of the present disclosure.

FIG. 10A illustrates an alternative embodiment of the storage system 34 having a coupling feature configured to couple to a complementary feature on the portable locker 16. For example, in the embodiment illustrated in FIG. 10A, the storage system 34 includes a wall 176 with receptacles 178 of a particular shape (e.g., elongate) that are configured to receive a complementary rotational locking feature associated with the portable locker 16. In another example, FIG. 10B is a schematic view of an embodiment of the storage system 34 that may be used to secure the portable locker 16 via a rotational locking feature 180. In the illustrated embodiment, the rotational locking feature 180 includes a first bar 182 radially extending away from a surface 184 of the pouch 48 of the portable locker 16, and a second bar 186 positioned orthogonal to the first bar 182. The second bar 186 is configured to rotate about an axis 190 of the first bar 182 to move the rotational locking feature 180 between an unlocked configuration and a locked configuration (FIG. 10C). As illustrated in FIG. 10B, the receptacles 178 on a front face 192 of the wall 176 may be arranged to receive the rotational locking feature 180 in an aligned configuration (e.g., the bars 182, 186 of the rotational locking feature 180 are aligned in parallel when unlocked). Once the bars 182, 186 are disposed through the receptacle 178, the rotational locking feature 180 may be actuated (e.g., manually or electronically) such that the second bar 186 rotates with respect to the first bar 182 to move the rotational locking feature 180 to the locked configuration and prevent extraction of the portable locker 16 from the wall 176 until unlocked. For example, FIG. 10C illustrates a back face 194 of the storage system 34 where the second bar 186 has been rotated about the axis 190, as shown by arrow 196. As shown in FIG. 10C, the second bar 186 is orthogonal to a widest dimension 200 of the receptacle 178. In this way, the portable locker 16 may be retained on the storage system 34. In other embodiments, different shapes (e.g., stars, triangles, squares, or character profiles) may be used.

In certain embodiments, the storage system 34 may include a locker that secures a plurality of portable lockers 16. For example, once the rider actuates the locking mechanism (e.g., the locking mechanism 52, pouch lock 124) for their respective portable locker 16, the rider 14 may place the locked portable locker 16 into the locker of the storage system 34. Each locker of the storage system 34 may be associated with a ride vehicle of the amusement park ride 10. Therefore, once the locked portable lockers 16 for each rider 14 assigned to the same ride vehicle are placed in the locker, the one or more crew members 28, or an operator of the amusement park ride, may lock the locker to secure the riders' portable lockers 16 during operation of the amusement park ride 10. In certain embodiments, the locker may be automatically locked. For example, a control system may transmit a signal to the locker that actuates the lock once all the riders 14 are secured in the ride vehicle associated with the locker. In some embodiments, this may include detecting the presence of the portable lockers 16 in the larger locker of the storage system 34 (e.g., via a weight measurement or wireless communications). The control system may also unlock the locker after the amusement park ride 10 experience is complete. For example, when the ride vehicle enters the unloading station, passes through an unlock gate, or the like.

Figure 11:
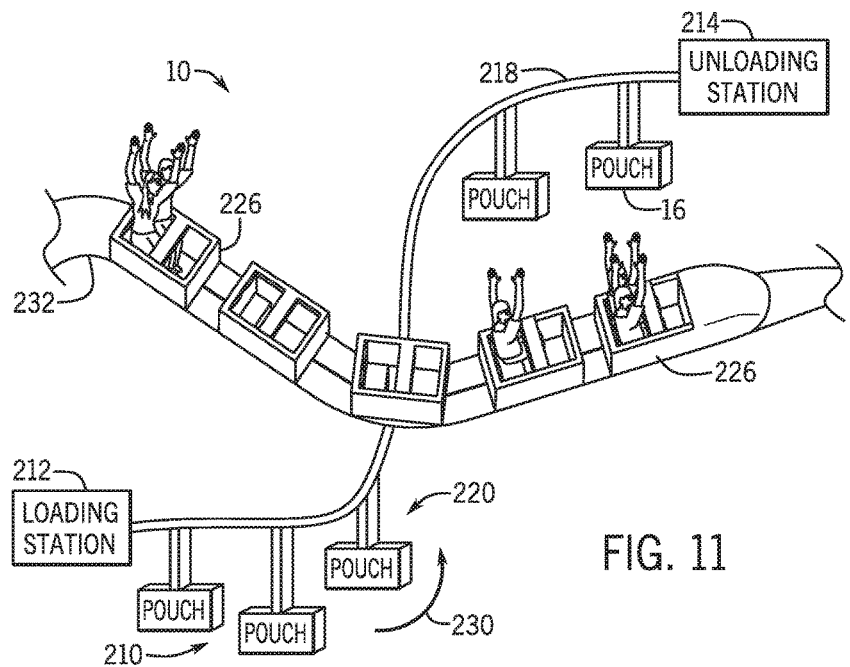
FIG. 11 is a schematic of the amusement park ride of FIG. 1, whereby the storage system is mobile and includes a transport system having a movable storage rack for transporting the portable locker from a loading station to an unloading station, in accordance with an embodiment of the present disclosure.

In some embodiments, the lockers may be located in a floor area or overhead area on an approach to the ride vehicle or in the ride vehicle itself (e.g., ride vehicle 226, see FIG. 11). The lockers may pop up from the floor or down from the ceiling and allow riders 14 to place their belongings into the lockers. After the riders 14 are properly seated and restrained, the lockers may recede into the floor or ceiling and then open again when the ride returns and riders 14 are exiting, which allows the riders to reclaim their belongings.

In certain embodiments, the storage system may be mobile. That is, the storage system may include features that move the portable locker 16 from one location to another location within the amusement park ride 10. For example, after the portable locker 16 is locked and secured to the storage system, the storage system may transport the portable locker 16 from the loading station to the unloading station. A mobile storage system may allow the riders to secure their assigned portable locker 16 to the storage system 34 at the loading station of the amusement park ride 10, which may be at a location different from the unloading station. For example, FIG. 11 illustrates an embodiment of the amusement park ride 10 having a mobile storage system 210 that transports the portable locker 16 from a loading station 212 to an unloading station 214. The mobile storage system 210 includes a transport system 218 that extends from the loading station 212 to the unloading station 214 of the amusement park ride 10. The transport system 218 may receive a storage rack 220 retaining one or more portable lockers 16 or may receive individual portable lockers 16. The transport system 218 moves the rack 220 and/or the individual portable lockers 16 from the loading station 212 to the unloading station 214 while the rider 14 enjoys the amusement park ride 10.

For example, prior to the rider 14 boarding a ride vehicle 226, the rider 14 may activate the locking mechanism (e.g., the locking mechanism 56 or pouch lock 124) to lock the loose items 20 within the portable locker 16, as discussed previously. Once locked, the rider 14 or the one or more crew members 28 may secure the locked portable locker 16 to the rack 220 at the loading station 212. Following attachment of the portable locker 16, the rider 14 may proceed to board the ride vehicle 226 and enjoy the amusement park ride 10. The transport system 218 may transport the portable lockers 16 by moving the rack 220 in a direction 230 towards the unloading station 214. The transport system 218 may include a conveyor belt, a railing system, or any other suitable transport system that moves the portable locker 16 from the loading station 212 to the unloading station 214. The transport system 218 may include retaining features such as hooks, fasteners, connectors, or the like that support and secure the storage rack 220 and/or the portable locker 16 onto the transport system 218.

In certain embodiments, a portion of the transport system 218 may be positioned below the ride vehicle 226. This may be useful in embodiments where the loading station 212 of the amusement park ride 10 is located on one side of the ride vehicle 226, and the unloading station 214 is positioned on an opposite side of the ride vehicle 226. That is, a pouch storage section of the transport system 218 (e.g., section where the rider 14 secures the portable locker 16 to the storage system 34) may be located on a loading side of the ride vehicle 226 that is substantially opposite an unloading side of the ride vehicle 226, and a pouch pick-up section (e.g., section where the rider 14 retrieves the portable locker 16 after unloading from the ride vehicle 226). The transport system 218 may extend from the loading station 212 to the unloading station 214 below ride tracks 232 of the amusement park ride 10 such that the transport system 218 does not interfere with operation of the amusement park ride 10, as shown in FIG. 11. Accordingly, the portable lockers 16 follow a path that is underneath the ride tracks 232 when transported from the loading station 212 to the unloading station 214. In this way, the transport system 218 does not interfere with a trajectory of the ride vehicle 226 during operation of the amusement park ride 10.

In other embodiments, at least a portion of the transport system 218 may be positioned above the tracks 232 and the ride vehicle 226. However, the transport system 218 may be positioned at any other location that transports the portable lockers 16 from the loading station 212 to the unloading station 214 and does not interfere with movement of the ride vehicle 226 along the tracks 232 during operation of the amusement park ride 10. Therefore, once the rider 14 unloads the ride vehicle 226, the rider 14 may retrieve the portable locker 16 assigned to them at the unloading station 214, and collect their loose items 20 from the portable locker 16 at or near the unloading station 214 before exiting the ride 10. For example, a ride manager/crew member (employee of the amusement park) may take the rack 220 and/or the portable locker 16 from the transport system 218 and position it in a designated location for pickup at the exit of the ride 10. In certain embodiments, the rack 220 and/or the portable locker 16 may be moved from the transport system 218 to the designated location for pickup by a mechanical system (e.g., a robotic arm or the like).

Figure 12:
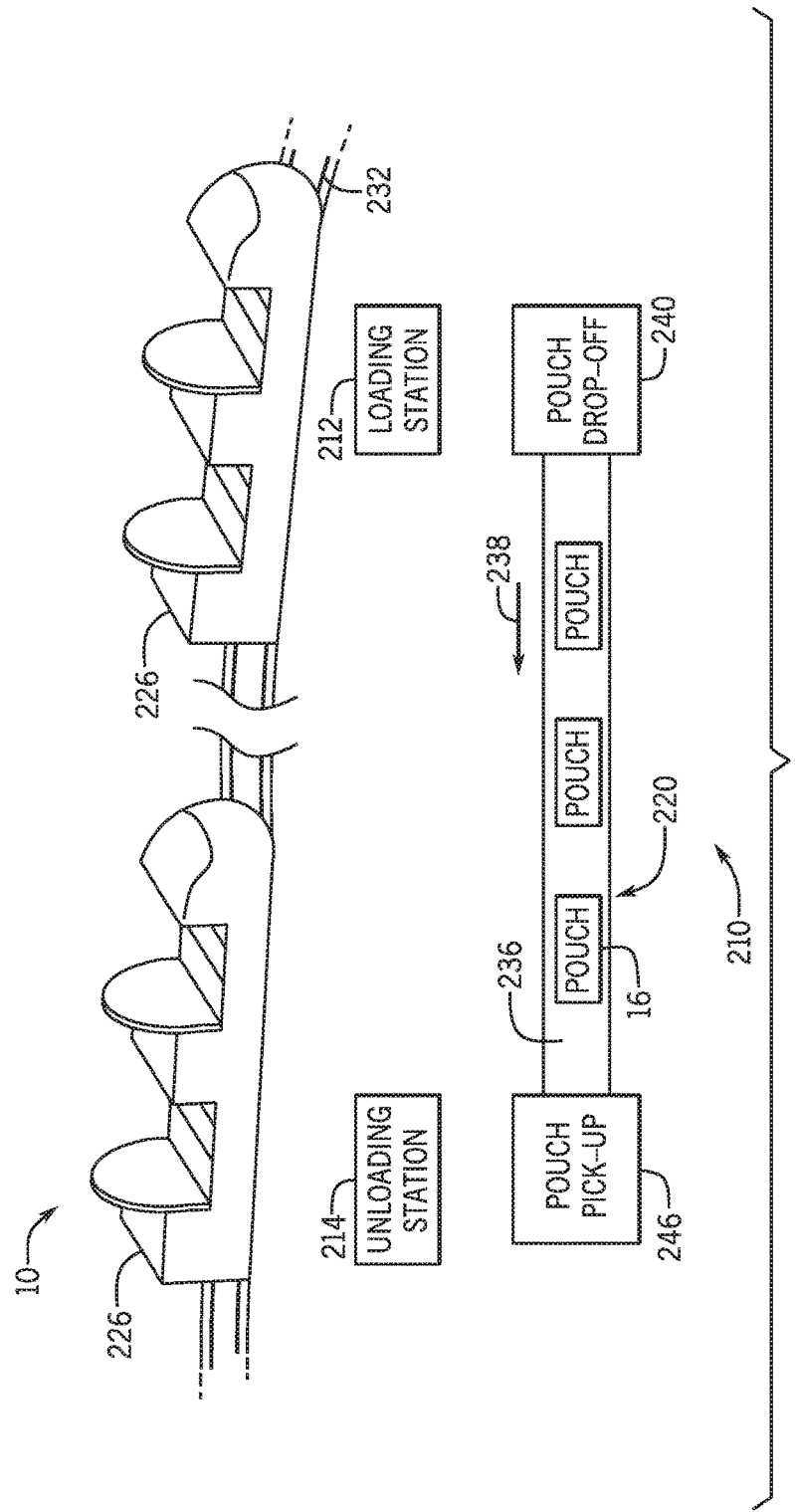
FIG. 12 is a schematic of the amusement park ride of FIG. 1, whereby the storage system is mobile and includes a transport system having a conveyor belt for transporting the portable locker from a loading station to an unloading station, in accordance with an embodiment of the present disclosure.

In other embodiments, the loading station 212 and the unloading station 214 of the amusement park ride 10 may be located on the same side of the ride vehicle 226. In this particular configuration, the riders enter and exit the ride vehicle 226 from the same side, as opposed to different sides as illustrated in FIG. 11. For example, FIG. 12 illustrates an embodiment of the amusement park ride 10 having the loading station 212 and the unloading station 214 positioned on the same side of the ride vehicle 226 and the ride tracks 232. In this particular embodiment, the transport system 218 transports the portable lockers 16 along a path that is parallel to at least a portion of the tracks 232. For example, in the illustrated embodiment, the transport system 220 includes a conveyor belt 236 that transports the portable lockers 16 in a direction 238 from a pouch drop-off site 240 at the loading station 212 to a pouch pick-up site 246 at the unloading station 214. The rider 14 may place their locked portable locker 16 on a surface of the conveyor belt 236 prior to boarding the ride vehicle 226 at the loading station 214. The conveyor belt 236 may move at a pace that delivers the locked portable locker 16 to the pouch pick-up site 246 at approximately the same time that the ride vehicle 226 used by the respective rider 14 arrives at the unloading station 214. In other embodiments, the conveyor belt 236 may feed the locked portable lockers 16 to a container located at the pouch pick-up site 246.

The riders may retrieve their respective portable locker 16 from the container at the pouch pick-up site 246. For example, each ride vehicle 226 may be assigned a container. Accordingly, the rider 14 may approach the container assigned to the ride vehicle 226 they exited from to retrieve their respective portable locker 16. Following retrieval of the portable locker 16, the rider 14 may unlock the locking mechanism 56 or pouch lock 124 electromagnetically (e.g., via the RFID gate 40, locking/unlocking device 130, or the like) or mechanically (e.g., a key or similar device), as discussed previously.

In one embodiment, the portable lockers 16 may be implemented as or in conjunction with autonomous vehicles on wheels that follow a path from the loading station 212 to the unloading station 214 or other location where the rider 14 may retrieve the stored loose items 20. The autonomous vehicles may include features (e.g., sensors) that block the autonomous vehicles from colliding with park guests and/or objects (e.g., walls, park structures, and the like). In certain embodiments, the portable locker 16 may not be autonomous. Rather, the portable locker 16 may include wheels that follow a predetermined path (e.g., a track or a programmed path specifically based on space) from the loading station 212 to a loose item pickup location associated with the amusement park ride 10. The portable lockers 16 may each have an actuator to raise the portable locker 16 up to the height of a ride vehicle seat or position the portable locker 16 in front of the ride vehicle seat, etc. to allow the riders to place the loose items 20 within the portable locker 16 after the rider has boarded the ride vehicle 226.

As discussed previously, the portable locker 16 may be used to store and secure the loose items 20 to keep the loose items 20 from being separated from the rider 14 during operation of the amusement park ride 10. It is now recognized that park guests (e.g., the rider 14) may not want to be separated from their loose items while on the amusement park ride 10. Additionally, it may be desirable for the rider 14 to capture the ride experience by taking a video or picture of themselves while enjoying the amusement park ride 10. Accordingly, the portable locker 16 may be configured to allow the rider 14 to secure the portable locker 16 to themselves or to the ride vehicle 226 such that the loose items 20 are in the possession of the rider 14.

As discussed previously, a rider of the amusement park ride may want to have their stored items with them at all times. That is, certain riders may not be comfortable storing their items in a remote area that is separate from the ride vehicle 226. Accordingly, it may be desirable for the rider 14 to secure the portable locker 16 to the ride vehicle 226 (e.g., a ride seat) of the amusement park ride 10. In addition, by allowing the rider 14 to board the ride 10 with the portable locker 16 and secure the portable locker 16 to the ride vehicle 226, the rider 14 may continue to have access to the loose items 20 stored in the portable locker 16 and the items 20 may be in the line of sight of the rider 14. Moreover, by allowing the rider 14 to stow the portable locker 16 on the ride vehicle 226, wait times and congestion of riders at the pouch storage/drop-off and pick-up stations 240, 246, respectively, may be mitigated.

Figure 13:
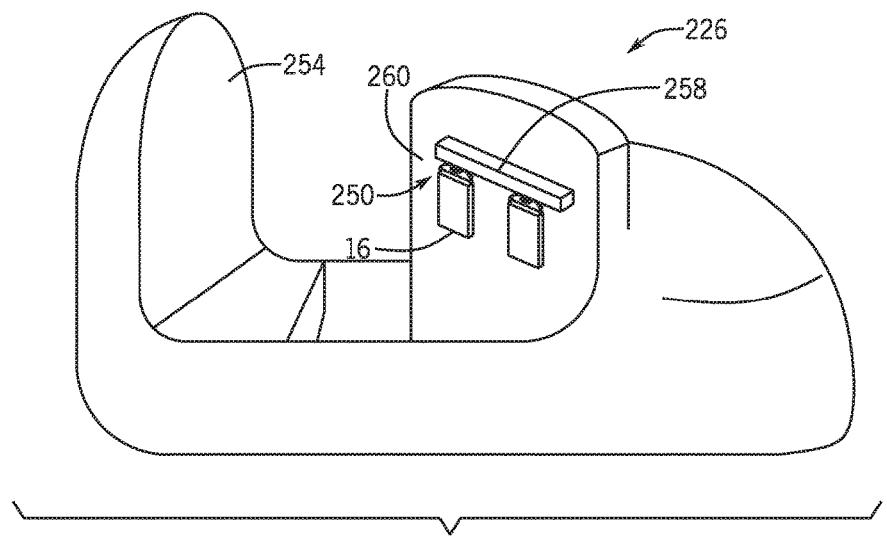
FIG. 13 is a schematic of a portion of a ride vehicle of the amusement park ride of FIG. 1, whereby a seat of the ride vehicle includes an integrated storage rack having a locking system for securing the portable locker to the ride vehicle, in accordance with an embodiment of the present disclosure.

FIG. 13 is an embodiment of the ride vehicle 226 having an integrated storage system 250 that may be used to secure the portable locker 16 to the ride vehicle 226. For example, in the illustrated embodiment, the integrated storage system 250 may be coupled to a ride seat 254 (e.g., a back support of the ride seat). The integrated storage system 250 may include a retaining bar 258 having one or more retaining features that engage with a complementary feature on the portable locker 16 to secure the portable locker 16 to the ride vehicle 226 in a manner similar to the storage rack 150 discussed previously. For example, the retaining bar 258 may include hooks, clips, pegs, bins, pockets, connectors, or the like that receive and retain the portable locker 16 within the ride vehicle 226 during operation of the amusement park ride 10. In the illustrated embodiment, the retaining bar 258 is positioned on a back portion 260 of the rider seat 254 such that the portable locker 16 is in front of a rider 14 occupying a ride seat that is behind the ride seat 254 having the retaining bar 258. However, the retaining bar 258 may be positioned on any portion of the ride vehicle 226 (e.g., a side wall, under the ride seat, seat or row divider, etc.).

In one embodiment, the portable locker 16 may be clear such that the rider 14 may access a touch screen or buttons of electronic devices stored within the portable locker 16. For example, the rider 14 may access a camera (e.g., on a cell phone) to take a picture or video through the portable locker 16 while the portable locker 16 is secured to the ride vehicle 226. In such an embodiment, the attachment point to the ride vehicle 226 (e.g., the integrated storage system 250) may be arranged such that the camera is pointed at a point of interest (e.g., the rider or the upcoming ride path) during the ride 10. The portable locker 16 and the integrated storage system 250 may include indicators to facilitate proper alignment for capturing video data (e.g., photos or video) during the ride 10.

Figure 14:
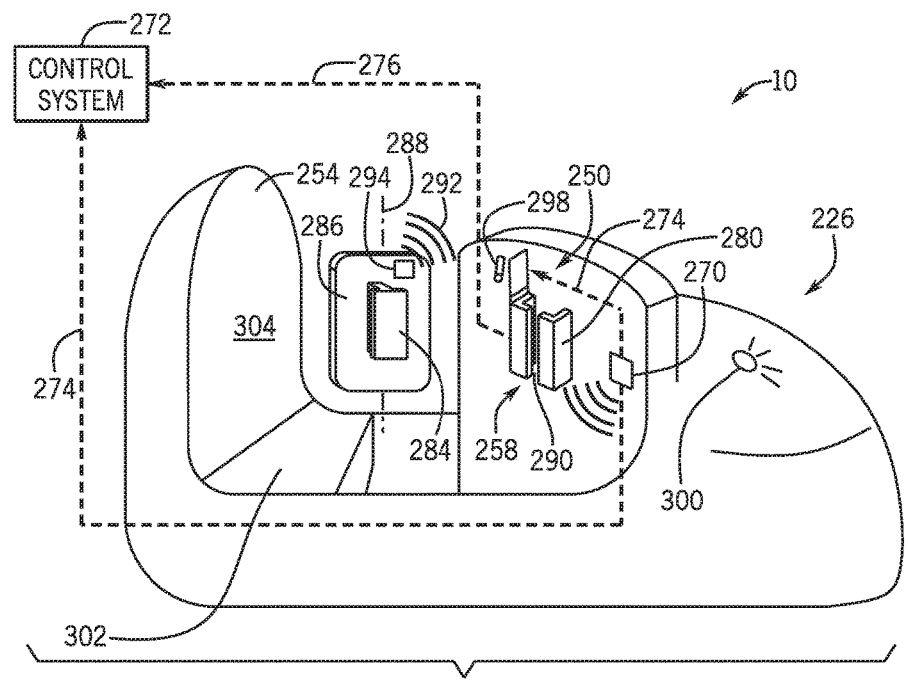
FIG. 14 is a schematic of the ride vehicle of FIG. 13, whereby the locking system includes a pair of brackets that couple to a complementary coupling feature on the portable locker and a sensor that activates a lock of the locking system, in accordance with an embodiment of the present disclosure.

In certain embodiments, a storage lock of the integrated storage system 250 may be activated by a control system of the amusement park ride 10. For example, FIG. 14 illustrates an embodiment of the amusement park ride 10 in which the ride seat 254 of the ride vehicle 226 includes one or more sensors 270 that are communicatively coupled to the retaining bar 258 and a control system 272 of the amusement park ride 10. The one or more sensors 270 may transmit a signal 274 to the retaining bar 258 and/or the control system 272 indicating that the ride seat 254 is occupied and that a portable locker 16 may need to be secured to the integrated storage system 250. For example, near-field communications may be utilized to determine that a rider 14 has a portable locker 16 or smartphone and is in the seating area. In response to such a determination, the rider 14 may be prompted to mount the portable locker 16 to the integrated storage system 250. Once the portable locker 16 is mounted onto the integrated storage system 250, the retaining bar 258 transmits another signal 276 to the control system 272 indicating that the portable locker 16 is attached. Following attachment of the portable locker 16 to the retaining bar 258, the control system 272 activates a locking mechanism of the integrated storage system 250 to retain and secure the portable locker 16 to the retaining bar 258 of the ride vehicle 226. Once the control system 272 detects that all portable lockers 16 within the ride vehicle 226 are secured to the integrated storage system 250, the control system 272 releases the ride vehicle 226 from the loading station 214. In certain embodiments, the control system 272 may allow the operator of the ride 10 to bypass attaching a portable locker 16 to the retaining bar 258, for example, in situations where the rider 14 does not have any loose items 20 that need to be stored in the portable locker 16.

In one embodiment, as illustrated in FIG. 14, the retaining bar 258 of the integrated storage system 250 may include a pair of brackets 280 sized and shaped to receive a complementary feature disposed on the portable locker 16. The complementary feature may engage the brackets 280 to retain the portable locker 16 to the ride vehicle 226. For example, the complementary feature may include an I-beam 284 or other similar feature disposed on at least a portion of an exterior surface 286 and extending along a longitudinal axis 288 of the portable locker 16. The I-beam 286 may slide into a channel 290 defined by the pair of brackets 280 to retain the portable locker 16 to the ride vehicle 226.

The one or more sensors 270 (e.g., an electromagnetic sensor) may receive a signal 292 from a transmitter 294 located on the portable locker 16 via a wireless communication link. The signal 292 transmitted by the transmitter 294 on the portable locker 16 may indicate that the portable locker 16 is within the ride vehicle 226. Once the one or more sensors 270 detect that the portable locker 16 is retained within the integrated storage system 250, the one or more sensors 270 may output the locking signal 274 to a locking mechanism 298 (e.g., a mechanical lock such as a latch) that activates the locking mechanism 298 and secures the portable locker 16 to the integrated storage system 250. In this manner, the retaining bar 258 and/or its associated locking components may be switched from an unsecured configuration to a secured configuration based on receiving the securing signal 274 or an unsecuring signal. Once the portable locker 16 is secured to the integrated storage system 250, the integrated storage system 250 may transmit the signal 276 to the control system 272 of the amusement park ride 10 indicating that the portable locker 16 is secured in the ride vehicle 226. The control system 272 may activate a light 300 on the ride vehicle 226 to indicate that the portable locker 16 is secured and the ride vehicle 226 is released from the loading station 212. If the one or more sensors 270 detect that the portable locker 16 is within the ride vehicle 226 but does not detect that the portable locker 16 is retained within the integrated storage system 250, the one or more sensors 270 do not output the signal 274 to the control system 272 and the ride vehicle 226 is not released from the loading station 212. In this particular embodiment, the light 300 may not be activated or may display a color indicating that the ride vehicle 226 may not be released. For example, in certain embodiments, the light 300 may be red to alert the operator of the amusement park ride 10 that the portable locker 16 is not secured within the ride vehicle 226 (e.g., the that ride vehicle 226 has one or more unsecured portable lockers 16 on board). The ride vehicle 226 may also send a signal to the central controller either permitting movement when all detected portable lockers 16 are secured or preventing movement based on detection of one or more unsecured portable lockers 16.

In certain embodiments, the integrated storage system 250 may be under a seat pan 302 of the ride seat 254. The seat pan 302 may include a storage space between a seat base and a seat pan cover. The storage space may be accessible (e.g., open) when the seat cover is in a first position, and is closed (e.g., locked) when the seat pan cover is in a second position. For example, when the seat pan cover is in the first position, the seat pan cover may be positioned parallel to a back rest 304 of the ride seat 254 when the ride seat 254 is not occupied. As such, the storage space may be readily accessible for the rider 14 to stow the items. Once the rider 14 has stowed the items in the storage space, the rider 14 may lower the seat pan cover to the second position. For example, in the second position, the seat pan cover may be orthogonal to the back rest 304 such that the seat pan cover covers the storage space and allows the rider 14 to occupy (e.g., sit) the ride seat 254. Therefore, the items 20 may be secured within the storage space of the seat pan 302 during operation of the amusement park ride 10. The rider 14 may retrieve the stowed items 20 when the rider 14 stands up after completion of the amusement park ride 10 experience. In this way, the rider 14 may be in possession of their items during operation of the amusement park ride 10. In addition, because the rider 14 is seated and restrained in the ride seat 254, the rider 14 may be unable to remove the stowed items 20 from the storage space within the ride seat 254 during operation of the amusement park ride 10. In certain embodiments, the seat pan 302 may include a locking mechanism (e.g., a mechanical lock, latch, hook, or the like) to secure the seat pan cover to the base after the rider 14 stows the items 20 in the storage space. Regardless of the configuration of the integrated storage system 250, the portable locker 16 may be released from the integrated storage system 250 upon conclusion of the ride 10, e.g., the controller may send a release signal to the integrated storage system 250 upon entry of the vehicle 226 into an unloading area. The release signal may trigger a switch of the retaining bar 258 to the unsecured configuration and, in certain embodiments, a visible indicator that the rider 14 may remove the portable locker 16. Further, control of the release of the portable locker 16 from the integrated storage system 250 may be in parallel or in series with permitting riders 14 to unlock the pouch 48. In certain embodiments, the riders 14 may be encouraged to depart more quickly by separating signals triggering the release of the portable locker 16 from the integrated storage system 250 from unlocking of the pouch 48. That is, the unlocking (e.g., via a transmitted unlocking signal) may only be possible at a location separated from the ride vehicle 226 to prevent dawdling during the unloading process. Accordingly, the riders 14 may take their portable lockers 16 from the ride vehicle 226 to the unlocking location.

Figure 15:
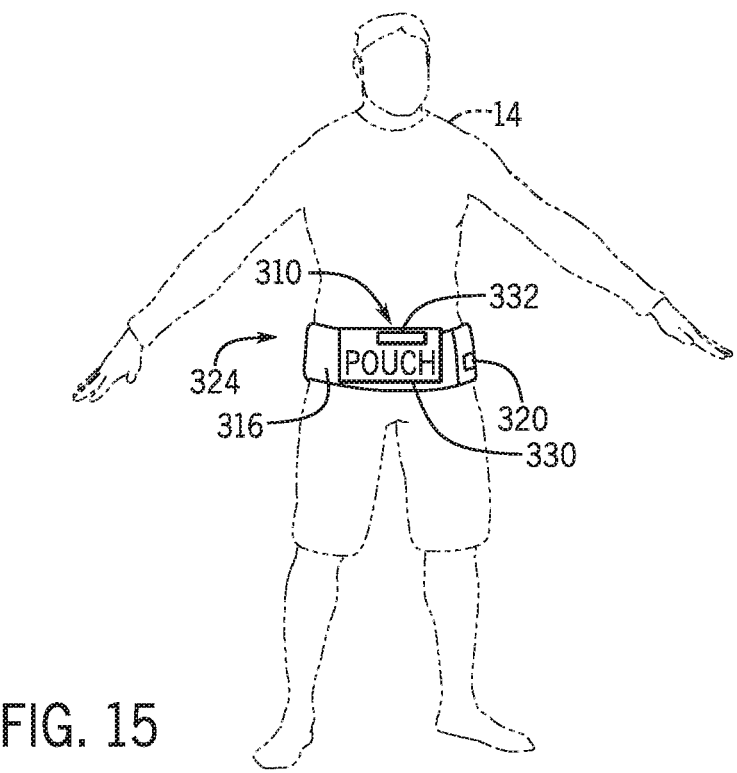
FIG. 15 is a schematic of a rider wearing a wearable locker pouch, whereby the wearable locker pouch includes a pouch for storing loose items and a restraint for coupling the wearable locker pouch to the rider, the restraint and pouch each having an actuatable restraint lock, in accordance with an embodiment of the present disclosure.

In certain embodiments, it may be desirable for the rider 14 to have access to his/her loose items 20, in particular cell phones, while the rider 14 is waiting to load and unload the amusement park ride 10. Accordingly, in certain embodiments, the portable locker 16 may be wearable (e.g., a wearable locker) such that the rider 14 may have possession of their loose items 20 at all times during the ride. The portable locker 16 may include features that allow the rider 14 or the one or more crew members 28 (e.g., an amusement park employee tasked with managing a queue or access point) to secure the portable locker 16 to the rider 14. In this manner, present embodiments allow the rider 14 to carry their loose items 20 with them onto the ride 10, which may be comforting for the rider 14 compared to leaving their personal items at the loading station for the ride 10 or any other location that is away from the rider 14. FIG. 15 illustrates an embodiment of a wearable pouch 310 that may be worn by the rider 14 of the amusement park ride 10 before, during, and after operation of the amusement park ride 10. That is, the rider 14 may have possession of the items stored in the wearable pouch 310 at all times during the ride experience. The wearable pouch 310 may come in various sizes and shapes to accommodate various items and rider preferences. To mitigate access of the stored items 20 during operation of the amusement park ride 10, the wearable pouch 310 may include features that block unlocking the wearable pouch 310.

In addition, the wearable pouch 310 may include features that may block or allow the use of cell phones or other electronic devices by the rider 14 after the items 20 are stored in the wearable pouch 310. For example, in certain embodiments, the wearable pouch 310 may be made from an opaque material that blocks the rider 14 from viewing and/or accessing the touch screen on the electronic devices stored within the wearable pouch 310. In other embodiments, the pouch material may have a thickness that is unsuitable for accessing buttons or a touch screen of the electronic device stored within the wearable pouch 310. In addition, the wearable pouch 310 may act as a Faraday cage such that the electronic devices stored within the wearable pouch 310 are unable to transmit signals. In embodiments that allow the rider 14 to use electronic devices (e.g., cell phones, digital cameras, etc.) after the items 20 are stored and locked within the wearable pouch 310, the wearable pouch 310 may be manufactured from a clear material. In some embodiments, the wearable pouch 310 may be capable of transitioning between modes to prevent or allow photos or operation of the device within. For example, in areas where pictures are not allowed, a transmission to electronics of the bag may change in transparency, e.g., cause it to turn an area from clear to opaque (for example, with liquid crystals).

Figure 16:
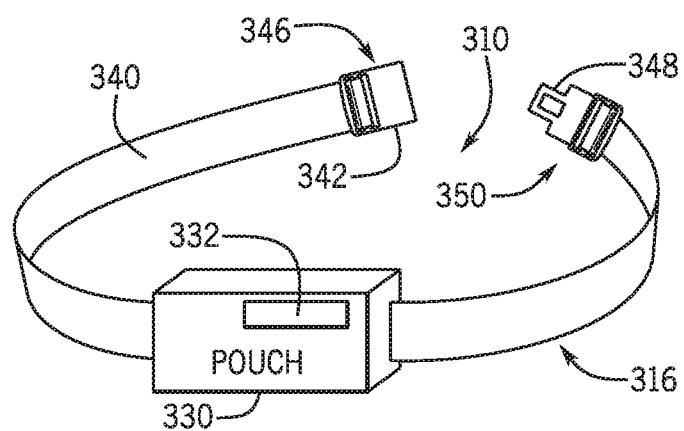
FIG. 16 is a schematic of the wearable locker pouch of FIG. 15, whereby the actuatable restraint lock includes a buckle having a first connector on a first end of the restraint and a second connector on a second end of the restraint, in accordance with an embodiment of the present disclosure.

In the illustrated embodiment, the wearable pouch 310 includes a restraint 316 having a locking mechanism 320 that allows the rider 14 to secure the wearable pouch 310 to their person. For example, as shown in FIG. 15, the wearable pouch 310 is restrained at the waist 324 of the rider 14. Similar to the portable locker 16 discussed previously, the wearable pouch 310 includes a pouch 330 that may be used to store the rider's items during operation of the amusement park ride 10 and a pouch lock 332 that secures the items within the pouch 330. For example, as illustrated in FIG. 16, the restraint 316 may include a strap or belt 340 having a first portion 342 of the locking mechanism 320 on a first terminal end 346 and a second portion 348 of the locking mechanism 320 on a second terminal end 350 that is spaced apart and substantially opposite the first terminating end 346. The first portion 342 of the locking mechanism may engage the second portion 348 of the locking mechanism 320 to couple the terminating ends 346, 350 of the belt 340, and thereby secure the wearable pouch 310 to the rider 14. By way of non-limiting example, the locking mechanism 320 includes a clip, buckle, snap-fit connectors, or any other suitable locking mechanism that may secure the wearable pouch 310 to the rider 14. In certain embodiments, the restraint 316 may be adjustable to accommodate various shapes and sizes of the riders.

Figure 17:
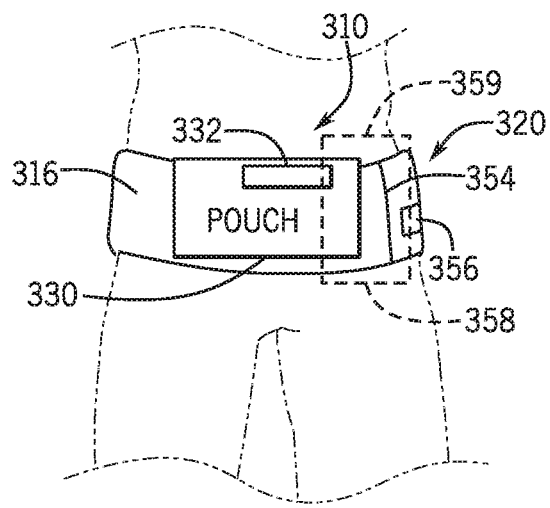
FIG. 17 is an embodiment of the wearable locker pouch of FIG. 15, in accordance with an embodiment of the present disclosure.

In certain embodiments, the locking mechanism 320 may be communicatively coupled to the pouch lock 332 (e.g., wireless or wired connection). For example, FIG. 17 illustrates an embodiment of the wearable pouch 310 in which the locking mechanism 320 includes a restraint lock 354 that, once activated, may block the pouch lock 332 from becoming unlocked. That is, once the locking mechanism 320 locks to activate the restraint lock 354 and secure the wearable pouch 310 to the rider 14, the locking mechanism 320 may block the rider 14 from unlocking the pouch lock 332 and opening the pouch 330 to access the items 20 stored within the pouch 330 during operation of the ride 10. For example, the locking mechanism 320 may include a transmitter 356 that transmits a lock signal 358 to the pouch lock 332 when the rider 14 passes through a control point (e.g., the control point 24) of the amusement park ride 10. Similarly, the locking mechanism 320 may transmit an unlock signal 359 to the pouch lock 332 after the ride 10 is complete and the ride vehicle 226 is at the unloading station 214. In some embodiments, the restraint lock 354 and the pouch lock 332 are the same mechanism.

In certain embodiments, the operator (e.g., the one or more crew members 28) may lock both the restraint lock 354 and the pouch lock 332 of the pouch 330 at the loading station 212 prior to the rider 14 boarding the ride vehicle 226. For example, the restraint lock 354 and the pouch lock 332 may include a mechanical lock (e.g., a fastener, connector, lock, or the like) that is locked and unlocked using a key accessible to only the operator of the ride 10. As the rider 14 boards the ride vehicle 226, the operator may lock the pouch and restraint locks 332, 354, respectively, with the key. In other embodiments, the pouch and restraint locks 332, 354 include an electromagnetic lock. Accordingly, prior to boarding the ride vehicle 226, the rider 14 may walk through a first electromagnetic station positioned at the loading station 212 (e.g., at the control point 24). The electromagnetic station transmits a wireless signal to the pouch and restraint locks 332, 354, thereby locking the pouch and restraint locks 332, 354. Once the amusement park ride 10 is terminated, the rider 14 may walk through a second electromagnetic station at the unloading station 214 (e.g., the RFID gate 40). Similar to the first electromagnetic station, the second electromagnetic station transmits a second signal to the pouch and restraint locks 332, 354, thereby unlocking the pouch 330 and the restraint 316, respectively, and allowing the rider 14 to retrieve the stored items. The rider 14 may deposit the wearable pouch 310 in a storage bin before exiting the amusement park ride 10.

In certain embodiments, the restraint 316 may be positioned on the rider 14 in a manner that does not allow the rider 14 to access the restraint lock 354 during operation of the amusement park ride 10. In this way the rider 14 may be unable to remove the wearable pouch 310 while on the amusement park ride 10. For example, in the embodiments illustrated in FIGS. 14-17, the restraint 316 of the wearable pouch 310 wraps around the rider's waist 324, similar to a belt, such that the pouch 330 is positioned on a front side of the rider 14, and the restraint lock 354 is positioned on a lateral side or back side of the rider 14. By positioning the restraint lock 354 on the lateral or back side of the rider 14, the rider 14 may have limited or no access to the restraint lock 354 during operation of the ride 10. Therefore, the rider 14 may be unable to unlock the restraint lock 354 while enjoying the ride 10.

Figure 18:
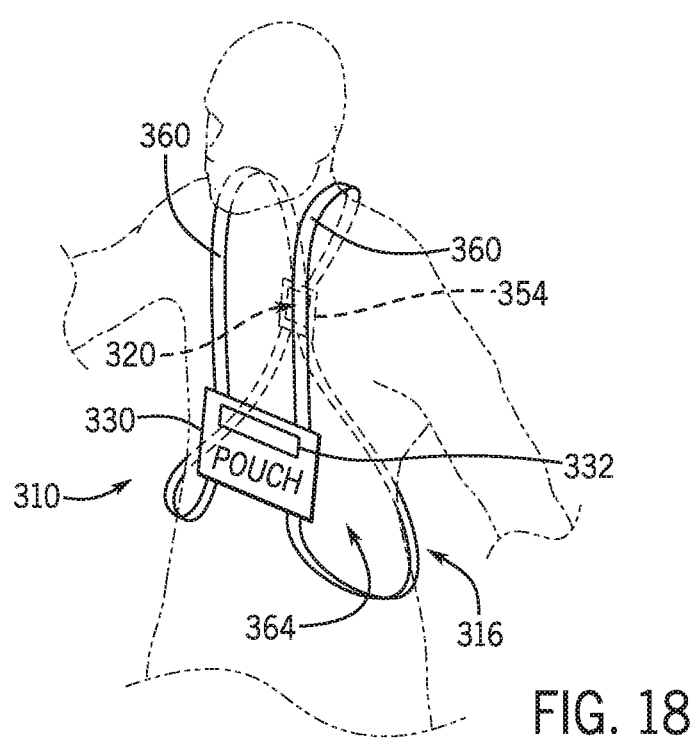
FIG. 18 is an embodiment of the wearable locker pouch of FIG. 15, in accordance with an embodiment of the present disclosure.

FIGS. 18-21 illustrate various other embodiments of the restraint 316 associated with the wearable pouch 310. For example, FIG. 18 illustrates an embodiment of the wearable pouch 310 having a backpack-like configuration. For example, as shown in FIG. 18, the restraint 316 of the wearable pouch 310 includes a set of straps 360 that are each coupled to the pouch 330 and to one another via the locking mechanism 320. The straps 360 may be adjustable to accommodate riders of different shapes and sizes. In use, the rider 14 may slide each arm through a respective loop 364 defined by each strap in the set of straps 360 such that the pouch 330 is positioned on the front side of the rider 14. The operator of the amusement park ride 10 or the rider 14 may secure the restraint lock 354 on the back side of the rider 14 (e.g., between the rider's waist and shoulders) to couple each strap of the set of straps 360 and secure the wearable pouch 310 to the rider 14. In this way, the rider 14 may not have access to the restraint lock 354 during operation of the amusement park ride 10. Accordingly, the rider 14 may be unable to remove the wearable pouch 310 during operation of the amusement park ride 10, which may prevent loss of the wearable pouch 310 and the items (e.g., the loose items 20) stored within the pouch 330.

Figure 19:
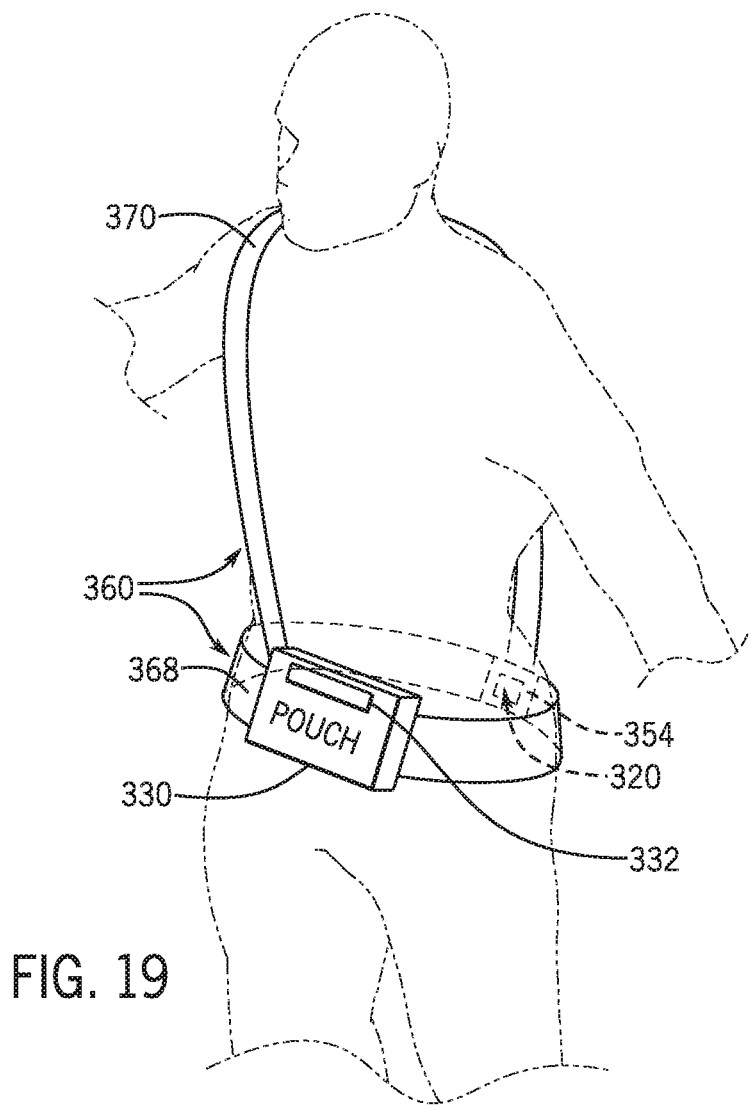
FIG. 19 is an embodiment of the wearable locker pouch of FIG. 15, in accordance with an embodiment of the present disclosure.

FIG. 19 also illustrates an embodiment of the wearable pouch 310 having the set of straps 360 arranged in a sash-like configuration (e.g., having one strap of the set of straps 360 extending from across the rider 14 at a diagonal from the right side of the rider's waist to the left side of the rider's shoulder, or vice versa). For example, in the illustrated embodiment, a first strap 368 of the set of straps 360 may be positioned around the waist 324 of the rider 14 (e.g., similar to a belt), and a second strap 370 of the set of straps 360 may be positioned across a torso of the rider 14 (e.g., from the right side to the left side of the rider 14 or vice versa) such that the second strap 370 wraps over a shoulder of the rider 14 and connects to the first strap 368 on the back side of the rider 14 at a location that is opposite a side where the second strap 370 wraps around the shoulder of the rider 14. The locking mechanism 320 of this configuration may be positioned such that it is difficult for the rider 14 to reach. Accordingly, a ride operator or other park guest may assist with engaging and disengaging the locking mechanism 320. Further, the locking mechanism 320 of each of these wearable pouch embodiments may be configured such that the locking mechanism can only be actuated by a ride operator using an electronic key or the like.

In certain embodiments, the wearable pouch 310 may include features that may allow the rider 14 to activate features on the electronic device (e.g., cell phone, camera, etc.) stored within the wearable pouch 310. For example, the wearable pouch 310 may include a trigger that may allow video and/or photo taking. The wearable pouch 310 may have a remote that the rider 14 uses to actuate the trigger and allow video and/or photo taking. In one embodiment, the wearable pouch 310 may include a transmitter that blocks the rider 14 from taking video and/or pictures with cell phones during operation of the amusement park ride 10 or at certain locations throughout the amusement park. This may be done by disabling the trigger. In one embodiment, the transmitter may send a signal to the electronic device stored in the wearable pouch 310 to alert the electronic device that the area is restricted and video and picture taking are not allowed. For example, the electronic device may receive instructions to block the camera. This may be achieved via the transmitter on the wearable pouch 310 or directly from an area transmitter. In another embodiment, the wearable pouch 310 itself may be capable of actuation to block access when signals are received from transmitters in certain areas by, for example, blocking a clear access window. Once the rider/guest leaves the restricted area, the transmitter may provide an output that indicates the rider/guest is not in a restricted area and video and/or picture taking is allowed.

Figure 20:
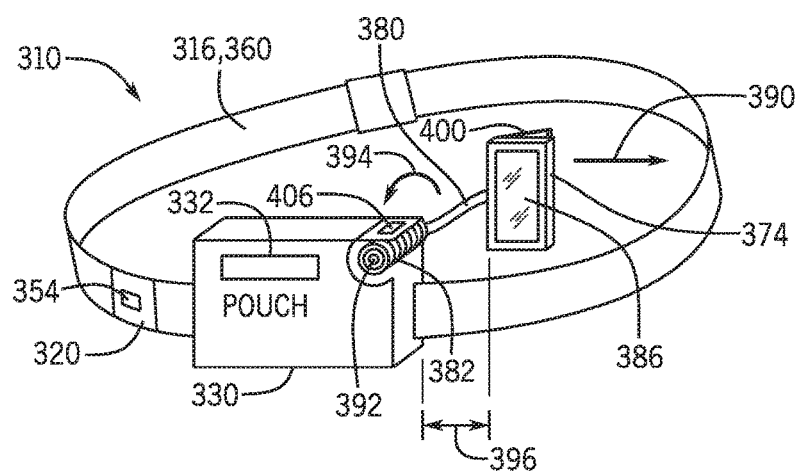
FIG. 20 is a schematic of the wearable locker pouch of FIG. 15 having a phone case and a retractable lanyard, in accordance with an embodiment of the present disclosure.
Figure 21:
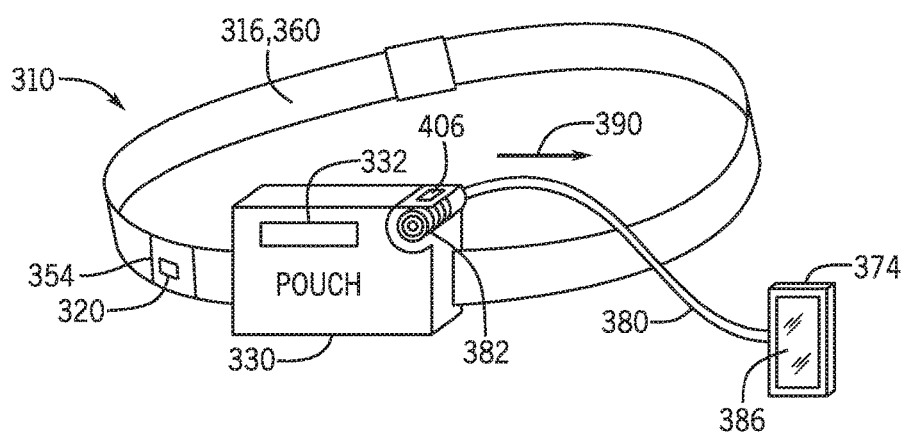
FIG. 21 is a schematic of the wearable locker pouch of FIG. 15 having a phone case and a retractable lanyard, in accordance with an embodiment of the present disclosure.

Embodiments of the present disclosure also include a wearable pouch having a phone case that may be separated from the pouch 330 to allow the rider 14 to access their cell phone after the pouch 330 and/or restraint 316 is locked (e.g., prior to boarding the amusement park ride 10). For example, FIGS. 20 and 21 illustrate an embodiment of the wearable pouch 310 having a phone case 374 (e.g., pouch) coupled to a retractable lanyard 380. The retractable lanyard 380 may be coupled to a reel 382 that forms part of the pouch 330. Prior to boarding the amusement park ride 10, the rider 14 may pull the phone case 374 away from the pouch 330 to access and engage with their cell phone 386. For example, when the rider 14 applies a pull force 390 on the phone case 374, the reel 382 rotates about an axis 392 in a direction 394 (e.g., counter clockwise) and unwinds the retractable lanyard 380 (see FIG. 21). The reel 382 may continue to rotate to release the retractable lanyard 380, thereby increasing a distance 396 between the pouch 330 and the phone case 374. The reel 382 may lock automatically or manually to maintain the retractable lanyard 380 at the desired distance 396 away from the phone case 374 without the rider 14 having to continuously exert the pull force 390 on the retractable lanyard 380.

Once the rider 14 is no longer engaging with the cell phone 386 in the phone case 374, the reel 382 may be unlocked to allow the retractable lanyard 380 to retract, thereby decreasing the distance 396 between the pouch 330 and the phone case 374. For example, the reel may rotate about the axis 392 in a direction that is substantially opposite the direction 394 (e.g., clockwise) to reel the retractable lanyard 380 and decrease the distance 396 between the phone case 374 and the pouch 330. In this way, the phone case 374 may be secured to the restraint 316 of the wearable pouch 310. The phone case 374 may have a clip or fastener 400 (e.g., snap-fit connectors, magnets, or any other suitable fastener) that enable the rider 14 to secure the phone case 374 to the strap 360 of the restraint 316 when the cell phone 386 is not in use and during operation of the amusement park ride 10. In one embodiment, the reel 386 may have an internal lock (e.g., a pin and lock mechanism) that disables the reel 386 from unwinding. In one embodiment, the reel 386 is not disabled but the device (e.g., phone) is clipped/locked in a certain position such that even if the reel 386 winds/unwinds, the device cannot substantially move.

The reel 386 may include a sensor 406 that may activate a locking mechanism within the reel when the rider boards the amusement park ride. For example, the sensor may receive a signal from the ride vehicle that activates a retracting mode of the locking mechanism. While in the reeling mode, the locking mechanism may automatically retract (e.g., reel) the retractable lanyard to decrease the distance between the pouch and the phone case to allow the rider to secure the phone case to the restraint of the wearable pouch. The locking mechanism may block the retractable lanyard from being released (e.g., unreel) when the rider exerts a pull force on the phone case. In this way, the rider 14 may not have access to the cell phone 386 during operation of the amusement park ride 10. Once the amusement park ride 10 is terminated, the sensor 406 may receive a deactivation signal from the ride vehicle 226 or an unlocking station (e.g., the RFID gate 40) within the unloading station 214 that may deactivate the locking mechanism and allow the rider 14 to unreel the retractable lanyard 380 to access and engage the cell phone 386 in the phone case 374.

Figure 22:
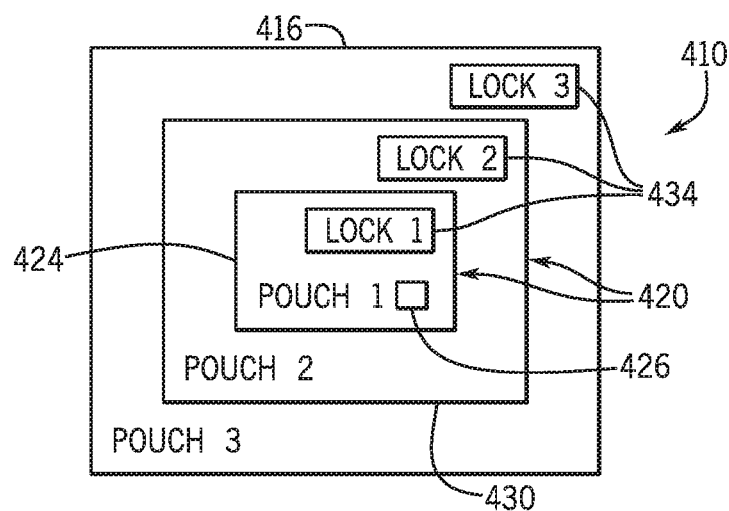
FIG. 22 is a schematic of an entertainment system having a plurality of locker pouches nested within one another, in accordance with an embodiment of the present disclosure.

In addition to facilitating loose item management for amusement park rides, the portable locker 16 may be part of an entertainment system that includes a plurality of portable lockers 16 nested within a portable locker of the portable lockers 16. The locking mechanism 56 of each portable locker of the plurality of portable lockers 16 may be activated and/or deactivated at different times using a different key (e.g., mechanical or electromagnetic). For example, FIG. 22 illustrates an embodiment of an entertainment system 410 having a pouch 416 that includes a plurality of sub-pouches 420 where each pouch of the plurality of sub-pouches 420 is nested within another pouch of the plurality of sub-pouches 420. An innermost pouch 424 may include a prize 426 (e.g., reward, trinket, or the like) that may be retrieved by a user after unlocking each pouch 416, 420, 424 from the outermost pouch 416 to the innermost pouch 424.

For example, as shown in FIG. 22, the entertainment system 410 may be a scavenger hunt pouch kit having a set of pouches 416, 420, 424 nested within another pouch. In the illustrated embodiment, the scavenger hunt pouch kit includes three pouches. However, any other suitable number of pouches may be used. The innermost pouch 424 is shaped and sized to be nested within a second pouch 430 that is shaped and sized to be nested within the outermost pouch 416. Each pouch 416, 424, 430 includes a pouch lock 434 that the user may unlock by following a set of clues that lead the user to an unlocking station, where the desired pouch 416, 424, 430 may be unlocked to expose the pouch nested within the previous pouch and provide a subsequent clue that leads the user to a second unlocking station. The user may continue to access clues and unlock the plurality of pouches 420 until the innermost pouch 424 is accessible and the prize 426 stored within the innermost pouch 424 (e.g., via a series of RFID locks 434) may be retrieved by the user.

In certain embodiments, the scavenger hunt pouch kit may not include multiple pouches. Rather, the scavenger hunt pouch kit may include a single pouch with multiple pouch locks that may each be unlocked at different unlocking stations throughout the amusement park. The user may retrieve the prize within the pouch after all the pouch locks have been unlocked.

Traditional systems and methods for controlling loose items on amusement park rides prevent guests from having "loose items" onboard by preventing them from ever entering the associated queue building with these items. However, it is now recognized that guests prefer to maintain more control and access to their loose items during wait times. Present embodiments allow the guests to bring their items with them into the queue building while also preventing them from smuggling the items onto the ride itself by putting it in their pockets.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a portable locker comprising a container configured to receive and store items;
a first lock coupled to the container and configured to lock the container to block access to the stored items, wherein the first lock comprises a detector configured to receive a wireless signal, and wherein receiving the wireless signal causes the first lock to lock or unlock; and
a restraint coupled to the container and comprising a second lock, wherein the second lock is configured to secure the portable locker to a rider of an amusement park ride and wherein the second lock comprises a transmitter.

2. The system of claim 1, comprising:
a lock control point comprising a first transmitter to transmit the wireless signal to cause the first lock of the portable locker to lock, wherein the lock control point is located before a load zone for a ride vehicle; and
an unlock actuation station comprising a second transmitter configured to transmit a second wireless signal to unlock the portable locker.

3. The system of claim 1, comprising a transmitter disposed on a key comprising a wristband, and wherein the transmitter is a radio frequency (RF) chip configured to transmit the wireless signal, and wherein the detector is a radio frequency identification (RFID) tag.

4. The system of claim 1, wherein the restraint comprises a cord having a first end coupled to a first side of the container and a second end removably coupled to a second side of the container opposing the first side, thereby forming a loop, and wherein the second lock is coupled to the second end.

5. The system of claim 1, wherein the restraint comprises a first strap coupled to the container and terminating in a first end and a second strap coupled to the container and terminating in a second end, wherein the first end comprises a first portion of the second lock and the second end comprising a second portion of the second lock, and wherein the second portion is configured to be removably coupled to the first portion to secure the portable locker to the rider.

6. The system of claim 1, wherein the first lock is communicatively coupled to the second lock via the transmitter.

7. The system of claim 1, wherein the portable locker comprises a second container coupled to the container via a retractable lanyard having a reel coupled to the container.

8. The system of claim 7, wherein the reel comprises a sensor and a third lock configured to lock the reel.

9. The system of claim 8, wherein the sensor is configured to receive the wireless signal and to actuate a retracting mode of the third lock prior to the rider boarding a ride vehicle.

10. A system, comprising:
a portable locker comprising:
a container configured to receive and store items, wherein the container comprises a first lock configured to lock the container to restrict access to the stored items, wherein the first lock comprises a detector configured to receive a wireless signal configured to lock or unlock the first lock; and
a ride vehicle comprising a retaining bar configured to reversibly couple to the portable locker, the retaining bar comprising a locking mechanism configured to receive the portable locker and to switch between a secured configuration that locks the portable locker to the retaining bar and an unsecured configuration that permits removal of the portable locker from the retaining bar based on a locking signal received from a controller.

11. The system of claim 10, wherein the controller is configured to detect a coupling of the portable locker to the retaining bar to activate the switch of the locking mechanism to the secured configuration.

12. The system of claim 10, wherein the ride vehicle comprises one or more sensors configured to detect the portable locker.

13. The system of claim 12, wherein the ride vehicle is configured to generate a signal that no unsecured portable locker is present on the ride vehicle.

14. The system of claim 10, wherein the portable locker comprises a material configured to change a degree of transparency based on a signal from the controller.

15. A system, comprising:
a portable locker comprising a first pouch and a second pouch coupled to one another, wherein each pouch is configured to receive and store items;
a first lock coupled to the first pouch and configured to lock the first pouch to block access to stored items in the first pouch, wherein the first lock comprises a detector configured to receive a first wireless signal configured to lock or unlock the first lock;
a reel disposed on the first pouch and comprising a retractable lanyard coupling the first pouch to the second pouch, wherein the retractable lanyard is configured to release and retract the second pouch to allow movement of the second pouch relative to the first pouch when the retractable lanyard is in an unlocked configuration, to prevent movement of the first pouch relative to the second pouch when the retractable lanyard is in a locked configuration, and to switch between the locked configuration and the unlocked configuration in response to a second wireless signal; and
a restraint coupled to the first pouch and comprising a second lock, wherein the second lock is configured to secure the portable locker to a rider of an amusement park ride.

16. The system of claim 15, wherein the reel comprises a third lock and a sensor, wherein the sensor is configured to receive the second wireless signal to switch between the unlocked configuration and the locked configuration.

17. The system of claim 15, wherein the second lock comprises a transmitter.

18. The system of claim 17, wherein the transmitter is a radio frequency (RF) chip configured to transmit the first wireless signal, and wherein the detector is a radio frequency identification (RFID) tag.

19. The system of claim 15, wherein the restraint comprises a belt coupled to the first pouch and comprising a first end having a first portion of the second lock and a second end having a second portion of the second lock, wherein the first portion is configured to couple to the second portion to secure the portable locker to the rider.

20. The system of claim 15, comprising:
a lock control point for actuation of the first lock of the portable locker prior to a load zone of a ride vehicle of an amusement park ride; and
an unlock actuation station configured to unlock the portable locker at a location between an unload zone of the ride vehicle and an exit of the amusement park ride.

* * * * *